United States Patent
Teraoka et al.

(10) Patent No.: US 9,776,468 B2
(45) Date of Patent: Oct. 3, 2017

(54) SHOCK ABSORBER

(71) Applicant: KYB Corporation, Tokyo (JP)

(72) Inventors: Takashi Teraoka, Gifu (JP); Tatsuya Masamura, Gifu (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 15/022,921

(22) PCT Filed: Sep. 19, 2014

(86) PCT No.: PCT/JP2014/074778
§ 371 (c)(1),
(2) Date: Mar. 17, 2016

(87) PCT Pub. No.: WO2015/041309
PCT Pub. Date: Mar. 26, 2015

(65) Prior Publication Data
US 2016/0229255 A1    Aug. 11, 2016

(30) Foreign Application Priority Data
Sep. 20, 2013   (JP) .................................. 2013-194869

(51) Int. Cl.
*F16F 9/18* (2006.01)
*B60G 17/08* (2006.01)
(Continued)

(52) U.S. Cl.
CPC ........... *B60G 17/08* (2013.01); *B60G 15/061* (2013.01); *F16F 9/187* (2013.01); *F16F 9/32* (2013.01);
(Continued)

(58) Field of Classification Search
CPC .... F16F 9/18; F16F 9/185; F16F 9/187; F16F 9/32; F16F 9/325; F16F 9/3235;
(Continued)

(56) References Cited

U.S. PATENT DOCUMENTS

| 8,967,344 B2 * | 3/2015 | Park ..................... F16F 9/3405 |
| | | 188/280 |
| 8,978,845 B2 * | 3/2015 | Kim ...................... F16F 9/5126 |
| | | 188/275 |

(Continued)

FOREIGN PATENT DOCUMENTS

| EP | 2103835 A1 | 9/2009 |
| EP | 2128484 A1 * | 12/2009 ............ F16F 9/5126 |

(Continued)

*Primary Examiner* — Thomas J Williams
(74) *Attorney, Agent, or Firm* — Rabin & Berdo, P.C.

(57) ABSTRACT

A shock absorber includes at least one of an expansion-side sensitive unit and a contraction-side sensitive unit. The expansion-side sensitive unit has an expansion-side actuating chamber that communicates with an expansion-side chamber and a contraction-side chamber, an expansion-side free piston that partitions the expansion-side actuating chamber into a first expansion-side pressure chamber and a second expansion-side pressure chamber, and an expansion-side spring element configured to bias the expansion-side free piston to compress the first expansion-side pressure chamber. The contraction-side sensitive unit has a contraction-side actuating chamber that communicates with a contraction-side chamber and a reservoir, a contraction-side free piston that partitions the contraction-side actuating chamber into a first contraction-side pressure chamber and a second contraction-side pressure chamber, and a contraction-side spring element configured to bias the contraction-side free piston to compress the first contraction-side pressure chamber.

15 Claims, 15 Drawing Sheets

(51) Int. Cl.
*F16F 9/50* (2006.01)
*F16F 9/32* (2006.01)
*B60G 15/06* (2006.01)
*F16F 9/34* (2006.01)
*F16F 9/512* (2006.01)

(52) U.S. Cl.
CPC ................. *F16F 9/34* (2013.01); *F16F 9/50* (2013.01); *F16F 9/5126* (2013.01)

(58) Field of Classification Search
CPC .... F16F 9/3257; F16F 9/46; F16F 9/50; F16F 9/516; F16F 9/5126; F16F 9/512; B60G 17/08
See application file for complete search history.

(56) References Cited

U.S. PATENT DOCUMENTS

| | | | |
|---|---|---|---|
| 9,428,030 B2* | 8/2016 | Teraoka | F16F 9/5126 |
| 2011/0056783 A1* | 3/2011 | Teraoka | F16F 9/5126 188/313 |
| 2011/0290603 A1* | 12/2011 | Yabe | F16F 9/348 188/282.1 |
| 2012/0234639 A1* | 9/2012 | Teraoka | F16F 9/5126 188/280 |
| 2016/0059663 A1* | 3/2016 | Teraoka | F16F 9/5126 188/266.2 |
| 2016/0229254 A1* | 8/2016 | Teraoka | F16F 9/50 |

FOREIGN PATENT DOCUMENTS

| | | |
|---|---|---|
| EP | 2977643 A1 | 1/2016 |
| JP | 2009-222136 A | 10/2009 |
| JP | 2011-247371 A | 12/2011 |
| JP | 2012-031900 A | 2/2012 |
| JP | 2013-053681 A | 3/2013 |
| JP | 2013-113307 A | 6/2013 |
| JP | 2013-185628 A | 9/2013 |

* cited by examiner

SHOCK ABSORBER

TECHNICAL FIELD

The present invention relates to a shock absorber.

BACKGROUND ART

There is known a damping force adjustable shock absorber including a cylinder, a piston slidably inserted into the cylinder, a piston rod movably inserted into the cylinder and connected to the piston, an expansion-side chamber and a contraction-side chamber partitioned by the piston inside the cylinder, an intermediate tube provided to envelop the cylinder to form a discharge passage in conjunction with the cylinder, an outer tube provided to envelop the intermediate tube to form a reservoir for storing hydraulic oil in conjunction with the intermediate tube, a charge passage that allows only a flow of hydraulic oil directed from the reservoir to the contraction-side chamber, a rectification passage provided in the piston to allow only a flow of hydraulic oil directed from the contraction-side chamber to the expansion-side chamber, and a damping force variable valve provided between the discharge passage and the reservoir.

In the shock absorber described above, the hydraulic oil flows from the cylinder to the reservoir through the discharge passage due to functions of the rectification passage and the charge passage in both the expanding and contracting motions. In addition, a damping force exerted by the shock absorber can be adjusted by controlling the resistance to the flow of hydraulic oil by using the damping force variable valve (for example, see JP 2009-222136 A).

In this manner, a damping force can be adjusted in the shock absorber described above. Therefore, it is possible to improve a vehicle ride quality by exert a damping force optimized to a vehicle vibration. In addition, in the shock absorber described above, the damping force variable valve is provided outside the cylinder. Therefore, it is very advantageous in that it is not required to sacrifice a stroke length of the shock absorber and harm loadability of a vehicle, compared to other types of shock absorbers in which the damping force variable valve is provided in the piston.

SUMMARY OF INVENTION

In the shock absorber described above, the resistance applied by the damping force variable valve to the flow of hydraulic oil is adjusted by controlling a thrust applied from a solenoid to a pilot valve body that controls a valve opening pressure of the damping force variable valve.

In order to generate a damping force optimized to suppress a vehicle vibration by using the shock absorber described above, an optimum damping force is obtained by using an electronic control unit (ECU) based on vibration information of a vehicle chassis detected by various sensors, and a control command is issued to a driver of the solenoid to exert the optimum damping force.

Therefore, an upper limit of a chassis vibration frequency that can be damped by the shock absorber by adjusting the damping force is restricted to several hertzs (Hz) depending on responsiveness of the damping force variable valve and a processing speed of the ECU. For this reason, it is difficult to suppress vibrations over this frequency level.

However, a chassis vibration frequency significantly affecting the vehicle ride quality is higher than the aforementioned dampable frequency level. Such a high frequency vibration is not suppressed by the shock absorber described above. Therefore, it is desired to further improve the vehicle ride quality.

In view of the aforementioned problems, it is therefore an object of the present invention to provide a shock absorber capable of improving a vehicle ride quality.

According to one aspect of the present invention, a shock absorber includes a cylinder, a piston slidably inserted into the cylinder, the piston partitioning the cylinder into an expansion-side chamber and a contraction-side chamber, a piston rod movably inserted into the cylinder, the piston rod being connected to the piston, a reservoir that stores a hydraulic fluid, a charge passage configured to allow only a flow of hydraulic fluid directed from the reservoir to the contraction-side chamber, a rectification passage configured to allow only a flow of hydraulic fluid directed from the contraction-side chamber to the expansion-side chamber, a damping force adjuster configured to allow only a flow of hydraulic fluid directed from the expansion-side chamber to the reservoir and change resistance to the flow of hydraulic fluid, and at least one of an expansion-side sensitive unit operated in an expanding motion of the shock absorber and a contraction-side sensitive unit operated in a contracting motion of the shock absorber, wherein the expansion-side sensitive unit has an expansion-side actuating chamber that communicates with the expansion-side chamber and the contraction-side chamber, an expansion-side free piston slidably inserted into the expansion-side actuating chamber, the expansion-side free piston partitioning the expansion-side actuating chamber into a first expansion-side pressure chamber communicating with the expansion-side chamber and a second expansion-side pressure chamber communicating with the contraction-side chamber, and an expansion-side spring element configured to bias the expansion-side free piston to compress the first expansion-side pressure chamber, and the contraction-side sensitive unit has a contraction-side actuating chamber that communicates with the contraction-side chamber and the reservoir, a contraction-side free piston slidably inserted into the contraction-side actuating chamber, the contraction-side free piston partitioning the contraction-side actuating chamber into a first contraction-side pressure chamber communicating with the contraction-side chamber and a second contraction-side pressure chamber communicating with the reservoir, and a contraction-side spring element configured to bias the contraction-side free piston to compress the first contraction-side pressure chamber.

DESCRIPTION OF EMBODIMENTS

First Embodiment

A description will now be made for a shock absorber S1 according to a first embodiment of the present invention with reference to the accompanying drawings.

Figure 1:
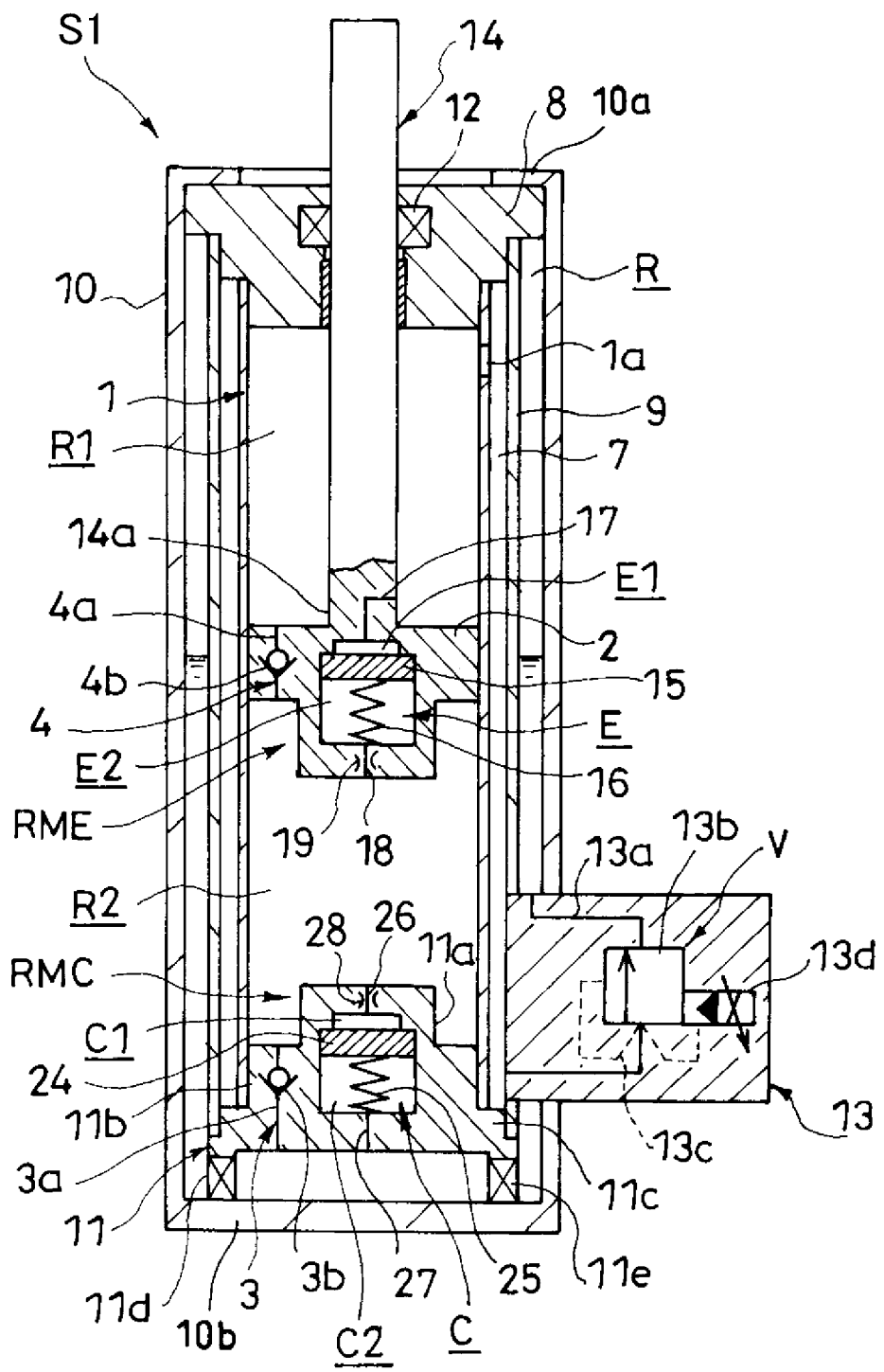
FIG. 1 is a cross-sectional view illustrating a shock absorber according to a first embodiment of the present invention.

Referring to FIG. 1, the shock absorber S1 includes a cylinder 1, a piston 2 slidably inserted into the cylinder 1 to partition the cylinder 1 into an expansion-side chamber R1 and a contraction-side chamber R2, a piston rod 14 movably inserted into the cylinder 1 and connected to the piston 2, a reservoir R that stores hydraulic oil as hydraulic fluid, a charge passage 3 that allows only a flow of hydraulic oil directed from the reservoir R to the contraction-side chamber R2, a rectification passage 4 that allows only a flow of hydraulic oil directed from the contraction-side chamber R2 to the expansion-side chamber R1, and a damping force variable valve V as a damping force adjuster that allows only a flow of hydraulic oil directed from the expansion-side chamber R1 to the reservoir R and capable of changing resistance applied to the flow of hydraulic oil.

In addition, the shock absorber S1 includes: an expansion-side sensitive mechanism RME acting as an expansion-side sensitive unit and having an expansion-side actuating chamber E communicating with the expansion-side chamber R1 and the contraction-side chamber R2, an expansion-side free piston 15 slidably inserted into the expansion-side actuating chamber E to partition the expansion-side actuating chamber E into a first expansion-side pressure chamber E1 communicating with the expansion-side chamber R1 and a second expansion-side pressure chamber E2 communicating with the contraction-side chamber R2, and an expansion-side spring element 16 that biases the expansion-side free piston 15 to compress the first expansion-side pressure chamber E1; and a contraction-side sensitive mechanism RMC acting as a contraction-side sensitive unit and having a contraction-side actuating chamber C communicating with the contraction-side chamber R2 and the reservoir R, a contraction-side free piston 24 slidably inserted into the contraction-side actuating chamber C to partition the contraction-side actuating chamber C into a first contraction-side pressure chamber C1 communicating with the contraction-side chamber R2 and a second contraction-side pressure chamber C2 communicating with the reservoir R, and a contraction-side spring element 25 that biases the contraction-side free piston 24 to compress the first contraction-side pressure chamber C1.

Furthermore, the shock absorber S1 includes an intermediate tube 9 provided to envelop the cylinder 1 to form a discharge passage 7 that causes the expansion-side chamber R1 and the reservoir R to communicate with each other in conjunction with the cylinder 1, and a bottomed cylindrical outer tube 10 provided to envelop the intermediate tube 9 and form the reservoir R in conjunction with the intermediate tube 9. The damping force variable valve V is provided between the discharge passage 7 and the reservoir R.

The piston rod 14 has one end 14*a* connected to the piston 2 and the other end protruding outward while its shaft is slidably supported by an annular rod guide 8 that seals the cylinder 1.

The shock absorber S1 is interposed between a chassis and a traveling wheel, for example, by mounting an upper end of the piston rod 14 in FIG. 1 to a chassis of a vehicle and mounting a lower end of the outer tube 10 in FIG. 1 to an axle that supports the traveling wheel so that a damping force is exerted to suppress a vibration between the chassis and the traveling wheel. It is noted that the piston rod 14 may also be mounted to an axle of a vehicle, and the outer tube 10 may also be mounted to a chassis of a vehicle.

According to this embodiment, the expansion-side actuating chamber E is provided in the piston 2 connected to the piston rod 14. However, the expansion-side actuating chamber E may be provided in the piston rod 14. Alternatively, the expansion-side actuating chamber E may not be directly built in the piston 2 and the piston rod 14. Instead, it may be provided in a separate member connected to the piston rod 14. Furthermore, the expansion-side actuating chamber E may be provided in a part other than the cylinder 1.

The lower ends of the cylinder 1 and the intermediate tube 9 in FIG. 1 are sealed by the valve casing 11. The valve casing 11 is provided with the contraction-side actuating chamber C and the charge passage 3. The contraction-side actuating chamber C may not be directly built in the valve casing 11. Instead, the contraction-side actuating chamber C may be provided in a separate member connected to the valve casing 11. Alternatively, the contraction-side actuating chamber C may be provided in a part other than the cylinder 1.

The expansion-side chamber R1, the contraction-side chamber R2, the expansion-side actuating chamber E, and the contraction-side actuating chamber C are filled with hydraulic oil. In addition, the reservoir R is filled with gas in addition to the hydraulic oil. It is noted that, for example, a liquid such as water or an aqueous solution other than the hydraulic oil may also be used as the hydraulic fluid.

A description will now be made for each part of the shock absorber S1 in more detail.

The piston 2 is connected to one end 14*a* of the piston rod 14. A gap between the piston rod 14 and the rod guide 8 is sealed with a seal member 12, so that the inside of the cylinder 1 is maintained in a liquid tight state.

The rod guide 8 has an outer diameter increasing stepwise, and its outer circumference is fitted to the intermediate tube 9 and the outer tube 10. As a result, the rod guide 8 blocks the upper ends of the cylinder 1, the intermediate tube 9, and the outer tube 10 in FIG. 1.

The valve casing 11 is fitted to the lower end of the cylinder 1 in FIG. 1. The valve casing 11 has a small diameter portion 11a inserted into the cylinder 1, a middle diameter portion 11b having an outer diameter larger than that of the small diameter portion 11a so as to be fitted to the inside of the cylinder 1, a large diameter portion 11c provided in the lower end side of the middle diameter portion 11b in FIG. 1 so as to be fitted to the inside of the intermediate tube 9 having an outer diameter larger than that of the middle diameter portion 11b, a tubular portion 11d provided in the lower end side of the large diameter portion 11c in FIG. 1, and a plurality of notches 11e provided in the tubular portion 11d.

The valve casing 11, the cylinder 1, the intermediate tube 9, the rod guide 8, and the seal member 12 are housed in the outer tube 10. If the upper end of the outer tube 10 in FIG. 1 is caulked, the valve casing 11, the cylinder 1, the intermediate tube 9, and the rod guide 8 are fixed to the outer tube 10 while they are held between the caulking portion 10a of the outer tube 10 and the bottom portion 10b of the outer tube 10.

It is noted that, instead of caulking of the opening end of the outer tube 10, a cap may be screwed to the opening end of the outer tube 10 to hold the valve casing 11, the cylinder 1, the intermediate tube 9, and the rod guide 8 between the cap and the bottom portion 10b.

Specifically, the charge passage 3 includes an inlet port 3a provided in the valve casing 11 to cause the reservoir R and the contraction-side chamber R2 to communicate with each other and a check valve 3b provided in the inlet port 3a.

The inlet port 3a is opened to the upper end of the middle diameter portion 11b of the valve casing 11 in FIG. 1 and the lower end of the large diameter portion 11c in FIG. 1. In addition, the inlet port 3a communicates with the reservoir R through the notch 11e. The check valve 3b is opened only when the hydraulic oil flows from the reservoir R to the contraction-side chamber R2. That is, the check valve 3b is set as a one-way passage to allow only a flow of hydraulic oil directed from the reservoir R to the contraction-side chamber R2 and suppress a reverse flow. In this manner, the inlet port 3a and the check valve 3b constitute the charge passage 3.

The piston 2 is provided with the rectification passage 4 that allows only a flow of hydraulic oil directed from the contraction-side chamber R2 to the expansion-side chamber R1. Specifically, the rectification passage 4 includes a passage 4a provided in the piston 2 to cause the contraction-side chamber R2 and the expansion-side chamber R1 to communicate with each other and a check valve 4b provided in the passage 4a.

The check valve 4b is opened only when the hydraulic oil flows along the passage 4a from the contraction-side chamber R2 to the expansion-side chamber R1. That is, the check valve 4b is set as a one-way passage that allows only a flow of hydraulic oil directed from the contraction-side chamber R2 to the expansion-side chamber R1 and suppresses a reverse flow. In this manner, the passage 4a and the check valve 4b constitute the rectification passage 4.

A through-hole 1a connected to the expansion-side chamber R1 is provided in the vicinity of the upper end of the cylinder 1 in FIG. 1. As a result, the expansion-side chamber R1 and an annular gap formed between the cylinder 1 and the intermediate tube 9 communicate with each other. The annular gap between the cylinder 1 and the intermediate tube 9 constitute the discharge passage 7 that causes the expansion-side chamber R1 and the reservoir R to communicate with each other.

The damping force variable valve V is provided in a valve block 13 fixed to extend across the outer tube 10 and the intermediate tube 9. The damping force variable valve V includes a flow passage 13a that connects the discharge passage 7 of the intermediate tube 9 to the reservoir R, a valve body 13b provided in the middle of the flow passage 13a, a pilot passage 13c used to apply a pressure of the expansion-side chamber R1 in the upstream side of the valve body 13b to the valve body 13b to be compressed in a valve opening direction, and a compressor unit 13d that exerts a compressing force for compressing the valve body 13b in a valve close direction in a variable manner.

According to this embodiment, the compressor unit 13d controls the pressure for compressing the valve body 13b in a valve close direction by using a solenoid as illustrated in FIG. 1. For this reason, the compressor unit 13d can change the pressure for compressing the valve body 13b in the valve close direction depending on a current supply amount supplied to the solenoid from the outside.

Alternatively, the compressor unit 13d may compress the valve body 13b only by an actuator such as a solenoid. Alternatively, the compressing force may be changed depending on a current amount or a voltage of the supplied current.

When the hydraulic fluid is a magnetic viscous fluid, instead of the damping force variable valve V, the damping force adjuster may change the resistance applied to the flow of the magnetic viscous fluid passing through the flow passage by applying a magnetic field to the flow passage that causes the discharge passage 7 and the reservoir R to communicate with each other, for example, by adjusting an intensity of the magnetic field by using a coil and the like based on the current amount supplied from the outside.

When the hydraulic fluid is an electroviscous fluid, the damping force adjuster may apply an electric field to the flow passage that causes the discharge passage 7 and the reservoir R to communicate with each other to change the resistance applied to the electroviscous fluid flowing through the flow passage by adjusting an intensity of the electric field based on an external voltage.

When the shock absorber S1 makes a contracting motion, the contraction-side chamber R2 is compressed by moving the piston 2 downward in FIG. 1, so that the hydraulic oil inside the contraction-side chamber R2 moves to the expansion-side chamber R1 through the rectification passage 4. In addition, during the contracting motion, as the piston rod 14 intrudes the inside of the cylinder 1, the hydraulic oil overflows as much as the intrusion volume of the rod inside the cylinder 1, and the surplus hydraulic oil is extracted from the cylinder 1 and is discharged to the reservoir R through the discharge passage 7. The shock absorber S1 raises the pressure inside the cylinder 1 by generating resistance to the flow of hydraulic oil moving to the reservoir R through the discharge passage 7 by using the damping force variable valve V to exert the contraction-side damping force.

When the shock absorber S1 makes an expanding motion, the expansion-side chamber R1 is compressed by moving the piston 2 upward in FIG. 1, and the hydraulic oil inside the expansion-side chamber R1 moves to the reservoir R through the discharge passage 7. In addition, during the expanding motion, the volume of the contraction-side chamber R2 increases by moving the piston 2 upward in FIG. 1, and the hydraulic oil corresponding to the increase amount is supplied from the reservoir R through the charge passage 3. The shock absorber S1 raises the pressure inside the expansion-side chamber R1 by generating resistance to the flow of hydraulic oil moving to the reservoir R through the discharge passage 7 by using the damping force variable valve V to exert an expansion-side damping force.

In this manner, if the shock absorber S1 makes an expanding or contracting motion, the hydraulic oil is necessarily discharged to the reservoir R from the inside of the cylinder 1 through the discharge passage 7. Therefore, the shock absorber S1 is considered as a uni-flow type shock absorber because the hydraulic oil flows sequentially in the order of the contraction-side chamber R2, the expansion-side chamber R1, and the reservoir R in a one-way passing manner. As a result, the shock absorber S1 generates both the expansion-side and contraction-side damping forces by using the single damping force variable valve V.

In the shock absorber S1, by setting a cross-sectional area of the piston rod 21 to a half of that of the piston 2, it is possible to set the amount of the hydraulic oil discharged from the cylinder 1 equally between the expanding and contracting motions if the amplitude is equal therebetween. Therefore, by setting the resistance generated by the damping force variable valve V equally, it is possible to set the expansion-side and contraction-side damping forces to the same value.

The expansion-side sensitive mechanism RME includes an expansion-side actuating chamber E communicating with the expansion-side chamber R1 and the contraction-side chamber R2, an expansion-side free piston 15 slidably inserted into the expansion-side actuating chamber E to partition the expansion-side actuating chamber E into a first expansion-side pressure chamber E1 communicating with the expansion-side chamber R1 and a second expansion-side pressure chamber E2 communicating with the contraction-side chamber R2, and an expansion-side spring element 16 that biases the expansion-side free piston 15 to compress the first expansion-side pressure chamber E1.

According to this embodiment, the expansion-side actuating chamber E is formed by a cavity portion provided in the piston 2. The expansion-side actuating chamber E communicates with the expansion-side chamber R1 through the first expansion-side passage 17 and communicates with the contraction-side chamber R2 through the second expansion-side passage 18.

The expansion-side free piston 15 is slidably inserted into the expansion-side actuating chamber E. The expansion-side free piston 15 partitions the expansion-side actuating chamber E into the first expansion-side pressure chamber E1 and the second expansion-side pressure chamber E2. Therefore, as the expansion-side free piston 15 moves inside the expansion-side actuating chamber E, any one of the first expansion-side pressure chamber E1 and the second expansion-side pressure chamber E2 expands while the other one contracts.

The first expansion-side pressure chamber E1 communicates with the expansion-side chamber R1 through the first expansion-side passage 17, and the second expansion-side pressure chamber E2 communicates with the contraction-side chamber R2 through the second expansion-side passage 18. The first expansion-side pressure chamber E1 and the second expansion-side pressure chamber E2 do not directly communicate with each other because they are separated by the expansion-side free piston 15. However, as the expansion-side free piston 15 moves inside the expansion-side actuating chamber E, one of the volumes of the first expansion-side pressure chamber E1 and the second expansion-side pressure chamber E2 increases while the other volume is reduced in proportion. Therefore, apparently, the first expansion-side passage 17, the expansion-side actuating chamber E, and the second expansion-side passage 18 act as a passage that causes the expansion-side chamber R1 and the contraction-side chamber R2 to communicate with each other.

According to this embodiment, an expansion-side valve element 19 is provided in the middle of the second expansion-side passage 18 to generate resistance to the flow of hydraulic oil passing through the second expansion-side passage 18. The expansion-side valve element 19 is formed by a throttle such as an orifice or a chalk. The expansion-side valve element 19 allows a flow of hydraulic oil directed from the second expansion-side pressure chamber E2 to the contraction-side chamber R2 and a flow of hydraulic oil directed from the contraction-side chamber R2 to the second expansion-side pressure chamber E2 and generates resistance to the flow of hydraulic oil. It is noted that the expansion-side valve element 19 may be provided in the first expansion-side passage 17 instead of or in addition to the second expansion-side passage 18.

An expansion-side spring element 16 such as a coil spring is housed in the second expansion-side pressure chamber E2. The expansion-side spring element 16 is housed in the second expansion-side pressure chamber E2 in a pressed state to bias the expansion-side free piston 15 to compress the first expansion-side pressure chamber E1. It is noted that the expansion-side spring element 16 may be formed by using an element other than the coil spring if it can exert a biasing force for biasing the expansion-side free piston 15. For example, the expansion-side free piston 15 may be biased by using an elastic body such as a disc spring or rubber.

The contraction-side sensitive mechanism RMC includes a contraction-side actuating chamber C communicating with the contraction-side chamber R2 and the reservoir R, a contraction-side free piston 24 slidably inserted into the contraction-side actuating chamber C to partition the contraction-side actuating chamber C into a first contraction-side pressure chamber C1 communicating with the contraction-side chamber R2 and a second contraction-side pressure chamber C2 communicating with the reservoir R, and a contraction-side spring element 25 that biases the contraction-side free piston 24 to compress the first contraction-side pressure chamber C1.

According to this embodiment, the contraction-side actuating chamber C is formed by a cavity portion provided in the valve casing 11. The contraction-side actuating chamber C communicates with the contraction-side chamber R2 through the first contraction-side passage 26 and communicates with the reservoir R through the second contraction-side passage 27.

The contraction-side free piston 24 is slidably inserted into the contraction-side actuating chamber C. The contraction-side free piston 24 partitions the contraction-side actuating chamber C into the first contraction-side pressure chamber C1 and the second contraction-side pressure chamber C2. Therefore, as the contraction-side free piston 24 moves inside the contraction-side actuating chamber C, any one of the first and second contraction-side pressure chambers C1 and C2 expands while the other one contracts.

The first contraction-side pressure chamber C1 communicates with the contraction-side chamber R2 though the first contraction-side passage 26, and the second contraction-side pressure chamber C2 communicates with the reservoir R through the second contraction-side passage 27. The first and second contraction-side pressure chambers C1 and C2 are partitioned by the contraction-side free piston 24, and thus, they do not directly communicate with each other. However, as the contraction-side free piston 24 moves inside the contraction-side actuating chamber C, one of the volumes of the first contraction-side pressure chamber C1 and the second contraction-side pressure chamber C2 expands while the other volume is reduced in proportion. Therefore, apparently, the first contraction-side passage 26, the contraction-side actuating chamber C, and the second contraction-side passage 27 act as a passage that causes the contraction-side chamber R2 and the reservoir R to communicate with each other.

According to this embodiment, a contraction-side valve element 28 that generates resistance to the flow of hydraulic oil passing through the first contraction-side passage 26 is provided in the middle of the first contraction-side passage 26. The contraction-side valve element 28 is formed by a throttle such as an orifice or a chalk. The contraction-side valve element 28 allows a flow of hydraulic oil directed from the first contraction-side pressure chamber C1 to the contraction-side chamber R2 and a flow of hydraulic oil directed from the contraction-side chamber R2 to the first contraction-side pressure chamber C1 and generates resistance to these flows of the hydraulic oil. It is noted that the contraction-side valve element 28 may be provided in the second contraction-side passage 27 instead of or in addition to the first contraction-side passage 26.

A contraction-side spring element 25 such as a coil spring is housed in the second contraction-side pressure chamber C2. The contraction-side spring element 25 is housed in the second contraction-side pressure chamber C2 in a compressed state so that the contraction-side free piston 24 is biased to compress the first contraction-side pressure chamber C1. It is noted that the contraction-side spring element 25 may be formed by an element other than the coil spring if it can exert a biasing force for biasing the contraction-side free piston 24. For example, the contraction-side free piston 24 may be biased by using an elastic body such as a disc spring or rubber.

Since the shock absorber S1 is configured as described above, the piston 2 moves upward in FIG. 1 when the shock absorber S1 makes an expanding motion. For this reason, the hydraulic oil is discharged from the compressed expansion-side chamber R1 to the reservoir R through the damping force variable valve V. In addition, the hydraulic oil is supplied from the reservoir R to the expanding contraction-side chamber R2 through the charge passage 3. Therefore, while the pressure of the expansion-side chamber R1 increases, the pressure of the contraction-side chamber R2 is nearly equalized with the pressure of the reservoir R.

Since the first expansion-side pressure chamber E1 of the expansion-side actuating chamber E communicates with the expansion-side chamber R1 through the first expansion-side passage 17, the pressure of the first expansion-side pressure chamber E1 is equalized with the pressure of the expansion-side chamber R1 during the expanding motion of the shock absorber S1. In addition, since the second expansion-side pressure chamber E2 communicates with the contraction-side chamber R2 through the second expansion-side passage 18, the pressure of the second expansion-side pressure chamber E2 is reduced under the pressure of the first expansion-side pressure chamber E1. Therefore, the expansion-side free piston 15 moves downward in FIG. 1 by pressing the expansion-side spring element 16. As a result, the first expansion-side pressure chamber E1 expands while the second expansion-side pressure chamber E2 contracts. It is noted that, in this case, since the expansion-side valve element 19 generates resistance to the flow of hydraulic oil passing through the second expansion-side passage 18, abrupt displacement of the expansion-side free piston 15 is suppressed.

The first contraction-side pressure chamber C1 of the contraction-side actuating chamber C communicates with the contraction-side chamber R2 through the first contraction-side passage 26, and the second contraction-side pressure chamber C2 communicates with the reservoir R through the second contraction-side passage 27. In addition, the pressure of the contraction-side chamber R2 is nearly equalized with the pressure of the reservoir R during the expanding motion of the shock absorber S1. For this reason, during the expanding motion of the shock absorber S1, the pressure of the first contraction-side pressure chamber C1 and the pressure of the second contraction-side pressure chamber C2 are nearly equalized with the pressure of the reservoir R, so that the contraction-side free piston 24 is biased by the contraction-side spring element 25 and does not move from a set position. Therefore, during the expanding motion of the shock absorber S1, the contraction-side free piston 24 is not operated.

Therefore, when the shock absorber S1 makes an expanding motion, the contraction-side sensitive mechanism RMC is not operated, and only the expansion-side sensitive mechanism RME is operated, so that the expansion-side actuating chamber E acts as an apparent flow passage depending on the movement amount of the expansion-side free piston 15. As a result, the hydraulic oil moves from the expansion-side chamber R1 to the contraction-side chamber R2 by detouring the damping force variable valve V.

When the shock absorber S1 makes a contracting motion, the piston 2 moves downward in FIG. 1. Therefore, the contracting contraction-side chamber R2 and the expanding expansion-side chamber R1 communicate with each other through the rectification passage 4, and the hydraulic oil is discharged from the cylinder 1 to the reservoir R through the damping force variable valve V. Accordingly, both the pressures of the expansion-side chamber R1 and the contraction-side chamber R2 increase to be equalized with each other.

Since the first contraction-side pressure chamber C1 of the contraction-side actuating chamber C communicates with the contraction-side chamber R2 through the first contraction-side passage 26, the pressure of the first contraction-side pressure chamber C1 is equalized with the pressure of the contraction-side chamber R2 during the contracting motion of the shock absorber S1. In addition, since the second contraction-side pressure chamber C2 communicates with the reservoir R through the second contraction-side passage 27, the pressure of the second contraction-side pressure chamber C2 becomes lower than the pressure of the first contraction-side pressure chamber C1. Therefore, the contraction-side free piston 24 moves downward in FIG. 1 by pressing the contraction-side spring element 25. As a result, the first contraction-side pressure chamber C1 expands, while the second contraction-side pressure chamber C2 contracts. It is noted that, in this case, since the contraction-side valve element 28 generates resistance to the flow of hydraulic oil passing through the first contraction-side passage 26, abrupt displacement of the contraction-side free piston 24 is suppressed.

The first expansion-side pressure chamber E1 of the expansion-side actuating chamber E communicates with the expansion-side chamber R1 through the first expansion-side passage 17, and the second expansion-side pressure chamber E2 communicates with the contraction-side chamber R2 through the second expansion-side passage 18. In addition, during the contracting motion of the shock absorber S1, the pressure of the expansion-side chamber R1 is nearly equalized with the pressure of the contraction-side chamber R2. For this reason, during the contracting motion of the shock absorber S1, the pressure of the first expansion-side pressure chamber E1 is nearly equalized with the pressure of the second expansion-side pressure chamber E2. Therefore, the expansion-side free piston 15 does not move from a set position while it is biased by the expansion-side spring element 16. Therefore, during the contracting motion of the shock absorber S1, the expansion-side free piston 15 is not operated.

Therefore, in a contracting motion of the shock absorber S1, the expansion-side sensitive mechanism RME is not operated, and only the contraction-side sensitive mechanism RMC is operated, so that contraction-side actuating chamber C acts as an apparent flow passage depending on a movement amount of the contraction-side free piston 24. As a result, the hydraulic oil moves from the cylinder 1 to the reservoir R by detouring the damping force variable valve V.

Here, it is assumed that the piston speed is equal for both high and low vibration frequencies input to the shock absorber S1.

If the vibration frequency input to the shock absorber S1 is low, an amplitude of the input vibration is large. For this reason, during the expanding motion, an amplitude of the expansion-side free piston 15 increases, and the biasing force of the expansion-side free piston 15 received from the expansion-side spring element 16 also increases. Meanwhile, the contraction-side free piston 24 is not operated. In comparison, during the contracting motion, the amplitude of the contraction-side free piston 24 is large, and the biasing force of the contraction-side free piston 24 received from the contraction-side spring element 25 increases. Meanwhile, the expansion-side free piston 15 is not operated.

When the shock absorber S1 expands with a low vibration frequency, the stroke amount increases, and the flow rate of the hydraulic oil discharged from the cylinder 1 to the reservoir R increases. In addition, the amplitude of the expansion-side free piston 15 increases, so that the biasing force of the expansion-side spring element 16 increases. For this reason, relative to the pressure of the first expansion-side pressure chamber E1, the pressure of the second expansion-side pressure chamber E2 is reduced to match the biasing force of the expansion-side spring element 16, and a pressure difference between the second expansion-side pressure chamber E2 and the contraction-side chamber R2 is reduced. As a result, the flow rate of the hydraulic oil passing through the second expansion-side passage 18 is reduced, and the exchange of the hydraulic oil between the expansion-side chamber R1 and the contraction-side chamber R2 through the expansion-side actuating chamber E acting as an apparent passage is reduced. Accordingly, the flow rate of the hydraulic oil passing through the damping force variable valve V increases in proportion, and the damping force generated by the shock absorber S1 is maintained in a strong state.

When the shock absorber S1 contracts with a low vibration frequency, the stroke increases, and the flow rate of hydraulic oil discharged from the cylinder 1 to the reservoir R increases. In addition, the amplitude of the contraction-side free piston 24 increases, and the biasing force of the contraction-side spring element 25 also increases. For this reason, relative to the pressure of the first contraction-side pressure chamber C1, the pressure of the second contraction-side pressure chamber C2 is reduced in proportion to the biasing force of the contraction-side spring element 25, and a pressure difference between the second contraction-side pressure chamber C2 and the reservoir R is reduced. As a result, the flow rate of the hydraulic oil passing through the second contraction-side passage 27 is reduced, and the exchange of the hydraulic oil between the cylinder 1 and the reservoir R through the contraction-side actuating chamber C acting as an apparent passage is also reduced. Accordingly, the flow rate of the hydraulic oil passing through the damping force variable valve V increases in proportion, and the damping force generated by the shock absorber S1 is maintained in a strong state.

That is, the shock absorber S1 exerts a strong damping force when it expands and contracts at a low vibration frequency.

When the input frequency of the shock absorber S1 is high, the amplitude of the input vibration is reduced. Therefore, the amplitude of the piston 2 is reduced, and the flow rate of the hydraulic oil discharged from the cylinder 1 to the reservoir R is also reduced.

During an expanding motion of the shock absorber S1, the amplitude of the expansion-side free piston 15 is reduced, and the biasing force of the expansion-side free piston 15 received from the expansion-side spring element 16 is also reduced. During a contracting motion of the shock absorber S1, the amplitude of the contraction-side free piston 24 is reduced, and the biasing force of the contraction-side free piston 24 received from the contraction-side spring element 25 is reduced.

Therefore, when the input frequency of the shock absorber S1 is high, a ratio of the flow rate passing through the apparent flow passage against the flow rate passing through the damping force variable valve V is higher than that of the low frequency vibration in both expanding and contracting processes of the shock absorber S1. Therefore, the damping force generated by the shock absorber S1 is reduced.

It is noted that, if the expansion/contraction speed of the shock absorber S1 increases over a certain level, the expansion-side valve element 19 and the contraction-side valve element 28 generate significant resistance to the flow of hydraulic oil. In this case, it is difficult to move the expansion-side free piston 15 and the contraction-side free piston 24. Therefore, the damping force attenuation effect is nearly not generated. Accordingly, a characteristic of the damping force of the shock absorber S1 is plotted as illustrated in FIG. 2.

Figure 2:
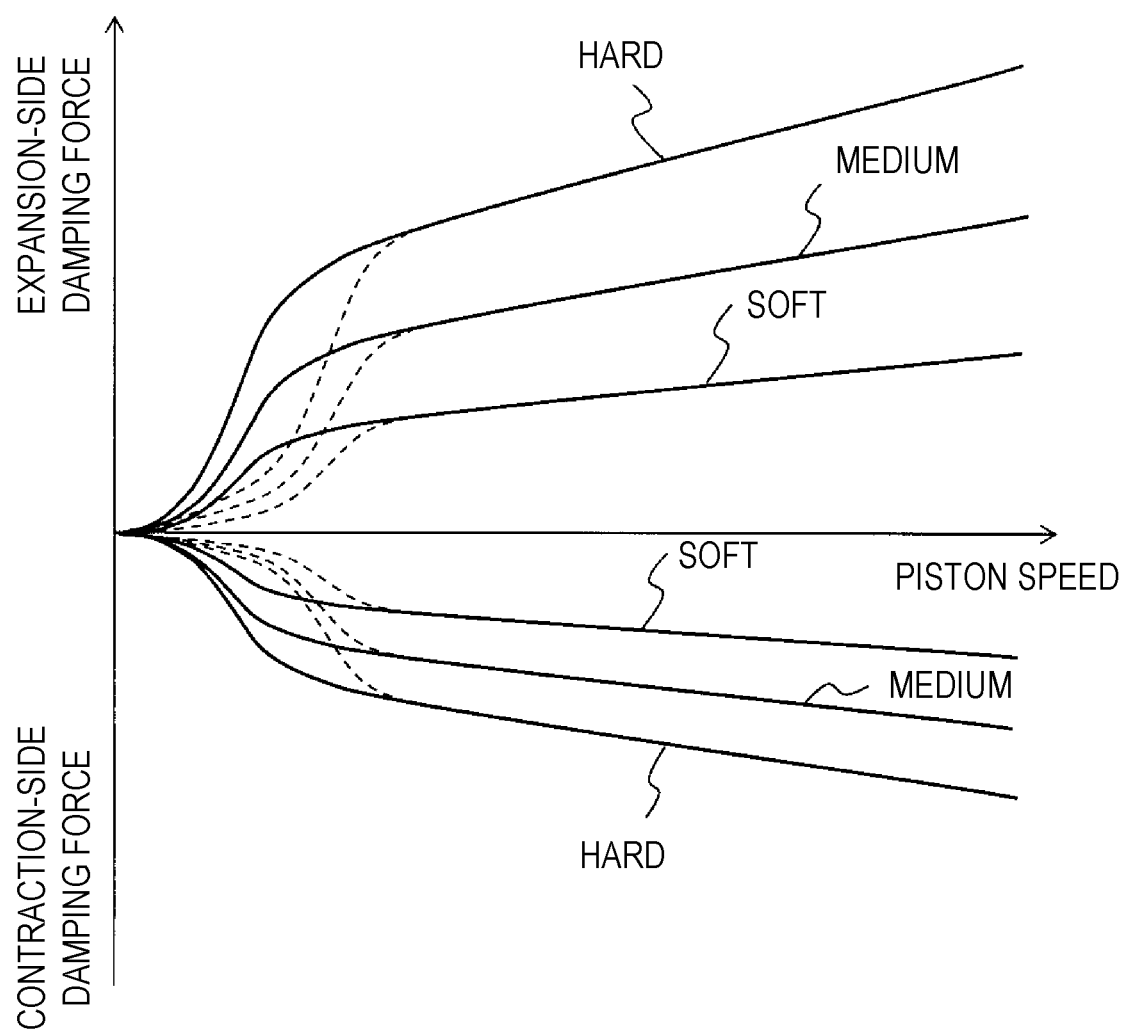
FIG. 2 is a characteristic diagram illustrating a damping force characteristic of the shock absorber according to the first embodiment of the present invention.

The solid lines of FIG. 2 indicate damping force characteristics when the expansion-side and contraction-side damping forces of the shock absorber S1 are set to SOFT, MEDIUM, and HARD by using the damping force variable valve V as a damping force adjuster. The dotted lines indicate damping force characteristics when the damping force is set to SOFT, MEDIUM, and HARD, assuming that a high frequency vibration is input to the shock absorber S1, and the damping force is reduced.

As illustrated in FIG. 2, in the shock absorber S1, it is possible to cause a change of the damping force to depend on the input vibration frequency. As a result, for a low frequency vibration input of a sprung mass resonant frequency level of a vehicle, a strong damping force is generated, so that it is possible to stabilize a posture of a chassis (sprung mass member) and prevent an uncomfortable feeling of a passenger during turns. In addition, for a high frequency vibration input of an unsprung mass resonant frequency level of a vehicle, a weak damping force is generated, and a vibration of the traveling wheel side (unsprung mass member side) is not transmitted to the chassis side (sprung mass member side). Therefore, it is possible to provide an excellent vehicle ride quality.

As described above, in the shock absorber S1, the damping force can be adjusted by controlling resistance generated by the damping force variable valve V and applied to the flow of hydraulic oil. That is, using the shock absorber S1, it is possible to reduce a damping force for a high frequency vibration while the damping force of the damping force variable valve V is adjusted.

Therefore, in the shock absorber S1, for a relatively low frequency vibration, it is possible to damp a vibration of a chassis by adjusting the damping force by controlling the damping force variable valve V. In addition, for a high frequency vibration which is difficult to suppress by controlling the damping force variable valve V, a weak damping force can be exerted mechanically, so that it is possible to effectively suppress a vehicle vibration by blocking a vibration from the traveling wheel side. Therefore, it is possible to remarkably improve a vehicle ride quality.

By providing at least one of the expansion-side sensitive mechanism RME and the contraction-side sensitive mechanism RMC, it is possible to exert a weak damping force for a high frequency vibration, which is difficult to suppress by controlling the damping force variable valve V, even in a uni-flow type shock absorber S1.

By providing both the expansion-side sensitive mechanism RME and the contraction-side sensitive mechanism RMC, it is possible to set the characteristic of the damping force attenuation effect individually for expanding and contracting motions of the shock absorber S1. The expansion-side sensitive mechanism RME generates a damping force attenuation effect when a high frequency vibration is input to the shock absorber S1 to make an expanding motion. The contraction-side sensitive mechanism RMC generates a damping force attenuation effect when a high frequency vibration is input to the shock absorber S1 to make a contracting motion. Therefore, if a damping force attenuation effect is desired only in an expanding motion, only the expansion-side sensitive mechanism RME may be provided. Similarly, if the damping force attenuation effect is desired only in a contracting motion, only the contraction-side sensitive mechanism RMC may be provided.

A frequency level where the damping force is reduced during an expanding motion may be arbitrarily determined depending on a pressure-receiving area of the expansion-side free piston 15, a spring constant of the expansion-side spring element 16, and resistance of the flow passage of the expansion-side valve element 19. A frequency level where the damping force is reduced in a contracting motion can be arbitrarily determined depending on a pressure-receiving area of the contraction-side free piston 24, a spring constant of the contraction-side spring element 25, and resistance of the flow passage of the contraction-side valve element 28. It is noted that the expansion-side valve element 19 and the contraction-side valve element 28 may also be removed depending on a setting of the frequency level for reducing the damping force.

During a contracting motion of the shock absorber S1, the expansion-side free piston 15 is biased such that the first expansion-side pressure chamber E1 is fully compressed by the expansion-side spring element 16. During a contracting motion of the shock absorber S1, the expansion-side free piston 15 returns to a neutral position. Therefore, it is possible to suppress a failure in obtaining a proper damping force attenuation effect that may be generated when the shock absorber S1 receives a high frequency vibration and makes an expanding motion because the expansion-side free piston 15 stops at a stroke end.

During an expanding motion of the shock absorber S1, the contraction-side free piston 24 is biased such that the first contraction-side pressure chamber C1 is fully compressed by the contraction-side spring element 25. During an expanding motion of the shock absorber S1, the contraction-side free piston 24 returns to a neutral position. Therefore, it is possible to suppress a failure in obtaining a proper damping force attenuation effect that may be generated when the shock absorber S1 receives a high frequency vibration and makes a contracting motion because the contraction-side free piston 24 stops at the stroke end.

Since the expansion-side sensitive mechanism RME and the contraction-side sensitive mechanism RMC are provided separately, it is possible to widen displaceable ranges of the expansion-side free piston 15 and the contraction-side free piston 24. Therefore, even when a flow rate of the hydraulic oil flowing to the expansion-side actuating chamber E and the contraction-side actuating chamber C increases, it is possible to continuously obtain the damping force attenuation effect.

Figure 3:
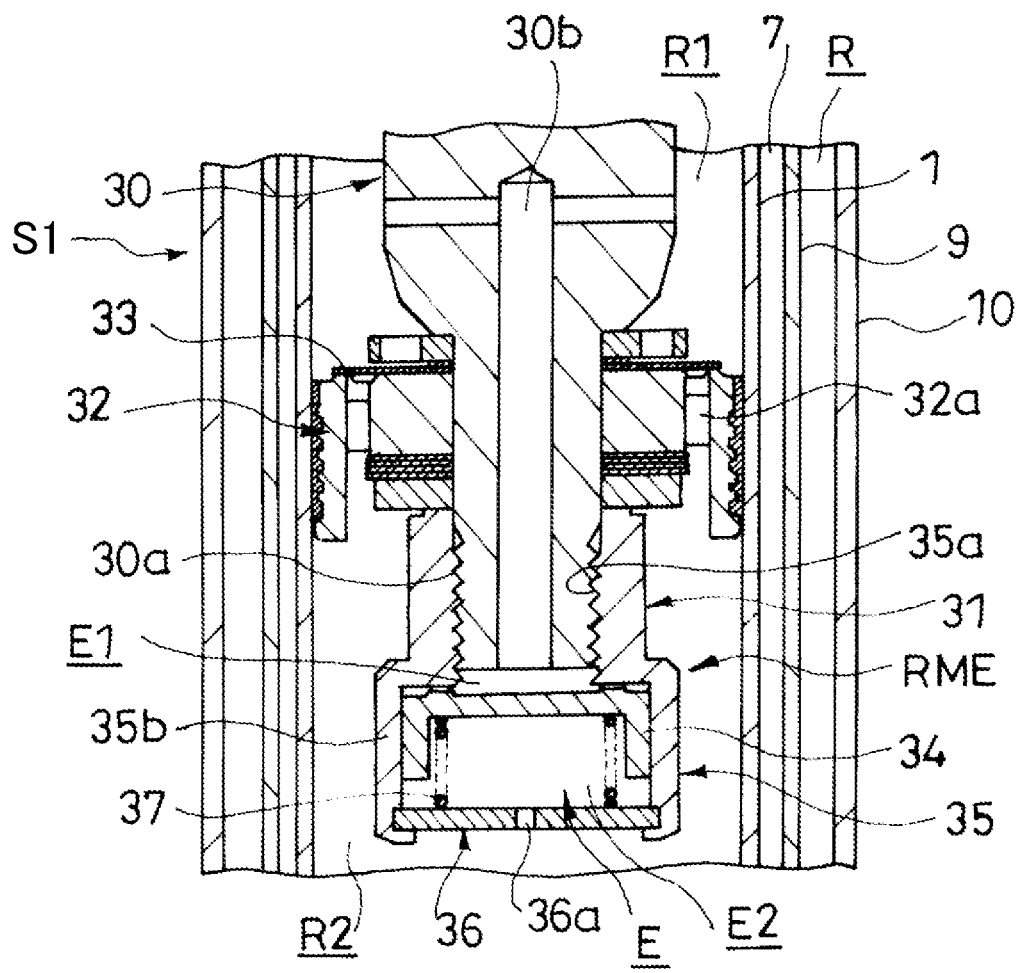
FIG. 3 is a cross-sectional view illustrating an expansion-side sensitive mechanism according to the first embodiment of the present invention.

The expansion-side actuating chamber E of the expansion-side sensitive mechanism RME may be provided, for example, in the expansion-side housing 31 installed to the piston rod 30 as illustrated in FIG. 3. The expansion-side housing 31 is installed to one end 30a of the piston rod 30 to fix the piston 32 to the piston rod 30.

The piston 32 having an annular shape is mounted to the outer circumference of one end 30a of the piston rod 30 and is provided with a port 32a that causes the contraction-side chamber R2 and the expansion-side chamber R1 to communicate with each other. The port 32a is stacked above the piston 32 in FIG. 3 and is opened or closed by an annular check valve 33 mounted to the outer circumference of one end 30a of the piston rod 30.

While the check valve 33 is fixed to the piston rod 30, its outer circumference side can be flexed. The check valve 33 opens the port 32a for a flow of hydraulic oil directed from the contraction-side chamber R2 to the expansion-side chamber R1 to allow a passage of the hydraulic oil and closes the port 32a for a flow of hydraulic oil directed from the expansion-side chamber R1 to the contraction-side chamber R2 to inhibit a passage of the hydraulic oil.

The expansion-side housing 31 includes a tubular casing member 35 that receives the expansion-side free piston 34 inserted into the inside and a lid member 36 that blocks an opening end of the casing member 35, which is the lower end in FIG. 3.

The casing member 35 includes a thread portion 35a having a small diameter in the upper side in FIG. 3 so as to be screwed to the outer circumference of the lower end of one end 30a of the piston rod 30, and a free piston housing portion 35b having a diameter larger than that of the thread portion 35a so as to slidably house the expansion-side free piston 34. In addition, the lower end of the casing member 35 is blocked by the lid member 36 to form the expansion-side actuating chamber E.

The lid member 36 is provided with an orifice 36a. As a result, the expansion-side actuating chamber E and the contraction-side chamber R2 communicate with each other. In addition, the orifice 36a acts as both the expansion-side valve element 19 and the second expansion-side passage 18. The piston rod 30 is provided with a first expansion-side passage 30b that is opened from the lower edge of the one end 30a and communicates with the expansion-side chamber R1. As a result, the expansion-side actuating chamber E and the expansion-side chamber R1 communicate with each other.

The expansion-side free piston 34 has a bottomed cylindrical shape. The outer circumference of the expansion-side free piston 34 makes sliding contact with the inner circumference of the free piston housing portion 35b of the casing member 35. The expansion-side free piston 34 partitions the expansion-side housing 31 into the first expansion-side pressure chamber E1 communicating with the expansion-side chamber R1 through the first expansion-side passage 30b and the second expansion-side pressure chamber E2 communicating with the contraction-side chamber R2 through the orifice 36a.

The expansion-side free piston 34 is biased to compress the first expansion-side pressure chamber E1 by a coil spring 37 as the expansion-side spring element 16 interposed between the bottom portion and the lid member 36.

By configuring the expansion-side sensitive mechanism RME in this manner, it is possible to assemble the expansion-side sensitive mechanism RME to the shock absorber S1 without any especial difficulty and specifically implement the shock absorber S1.

Figure 4:
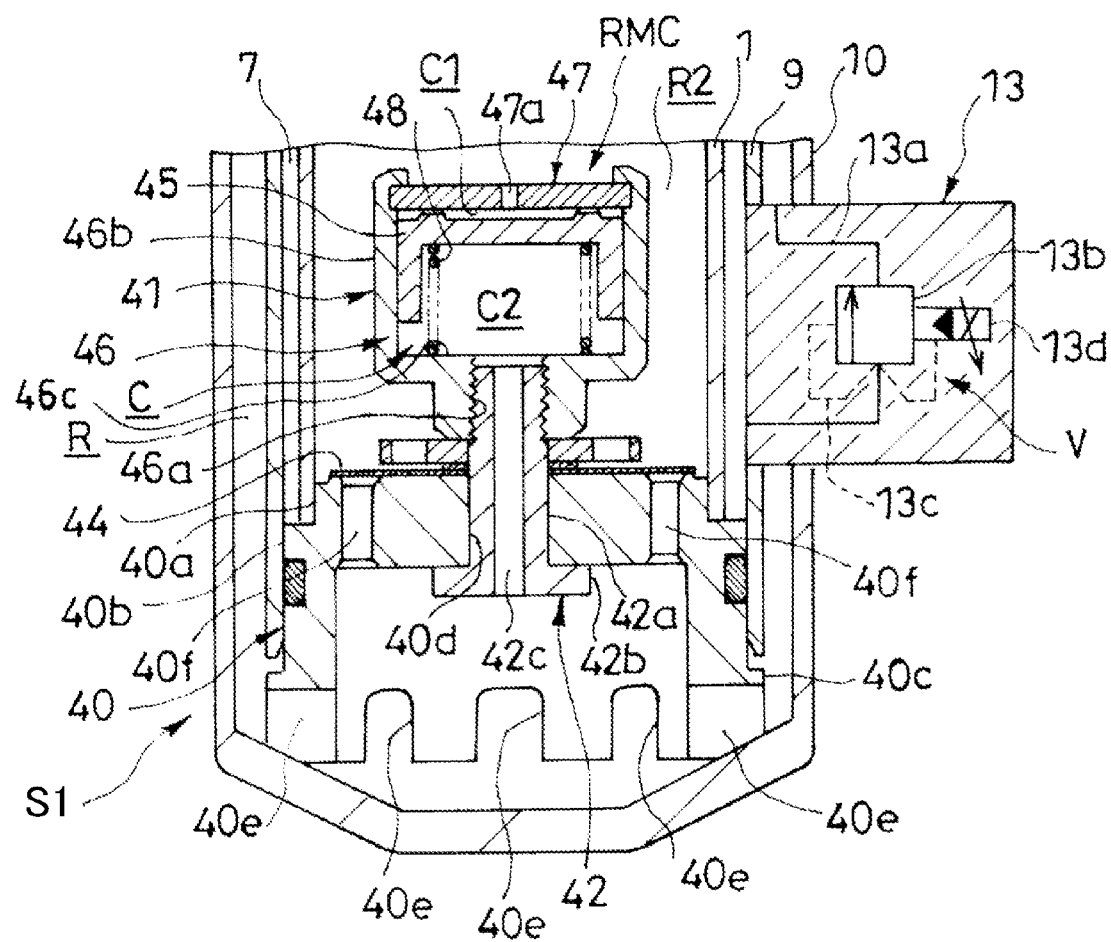
FIG. 4 is a cross-sectional view illustrating a contraction-side sensitive mechanism according to the first embodiment of the present invention.

The contraction-side actuating chamber C of the contraction-side sensitive mechanism RMC may be provided, for example, in the contraction-side housing 41 installed to the valve casing 40 as illustrated in FIG. 4. The valve casing 40 is fitted to the lower end of the cylinder 1 in FIG. 1. The contraction-side housing 41 is installed to the leading edge of the center rod 42 where the valve casing 40 is assembled, so that the check valve 44 stacked on the valve casing 40 is fixed to the center rod 42.

The valve casing 40 having a bottomed cylindrical shape includes a small diameter portion 40a provided in its outer circumference and fitted to the lower end of the cylinder 1, a middle diameter portion 40b that is fitted to the intermediate tube 9 and has an outer diameter larger than that of the small diameter portion 40a, and a large diameter portion 40c that is provided in the lower end side of the middle diameter portion 40b in FIG. 4 and has an outer diameter larger than that of the middle diameter portion 40b. An insertion hole 40d that receives the inserted center rod 42 is provided in the bottom portion of the valve casing 40. A plurality of notches 40e is provided in the lower end of the large diameter portion 40c in FIG. 4. The valve casing 40 is housed in the outer tube 10 while being nipped between the outer tube 10 and the cylinder 1.

The center rod 42 includes a shaft portion 42a having a thread portion in its leading edge and a head portion 42b provided in a basal end of the shaft portion 42a. The valve casing 40 may be assembled to the center rod 42 by inserting the shaft portion 42a of the center rod 42 to the insertion hole 40d from the downside of the valve casing 40.

An inlet port 40f causing the contraction-side chamber R2 and the reservoir R to communicate with each other is provided in the bottom portion of the valve casing 40. The inlet port 40f is opened or closed by an annular check valve 44 stacked above the valve casing 40 in FIG. 4 and mounted to the outer circumference of the center rod 42.

While the check valve 44 is fixed to the center rod 42, its outer circumference side can be flexed. The check valve 44 opens the inlet port 40f for a flow of hydraulic oil directed from the reservoir R to the contraction-side chamber R2 to allow a passage of the hydraulic oil and closes the inlet port 40f for a flow of hydraulic oil directed from the contraction-side chamber R2 to the reservoir R to inhibit a passage of the hydraulic oil.

The contraction-side housing 41 includes a tubular casing member 46 provided inward to receive the inserted contraction-side free piston 45 and a lid member 47 that blocks an opening end of the upper edge of the casing member 46 in FIG. 4.

The lower side of the casing member 46 in FIG. 4 has a smaller diameter. The casing member 46 includes a thread portion 46a screwed to the outer circumference provided in the upper end of the center rod 42 and a free piston housing portion 46b that has a diameter larger than that of the thread portion 46a and slidably houses the contraction-side free piston 45. In addition, the upper end of the casing member 46 is blocked by the lid member 47 to form the contraction-side actuating chamber C.

The lid member 47 is provided with an orifice 47a. As a result, the contraction-side actuating chamber C and the contraction-side chamber R2 communicate with each other. In addition, the orifice 47a acts as both the contraction-side valve element 28 and the first contraction-side passage 26. The center rod 42 is provided with a second contraction-side passage 42c that is opened from the leading edge of the shaft portion 42a and communicates with the lower end of the head portion 42b. As a result, the contraction-side actuating chamber C and the reservoir R communicate with each other.

The contraction-side free piston 45 has a bottomed cylindrical shape, and its outer circumference makes sliding contact with the inner circumference of the free piston housing portion 46b of the casing member 46. The contraction-side free piston 45 partitions the contraction-side housing 41 into the first contraction-side pressure chamber C1 communicating with the contraction-side chamber R2 through the orifice 47a and the second contraction-side pressure chamber C2 communicating with the reservoir R through the second contraction-side passage 42c.

The contraction-side free piston 45 is biased to compress the first contraction-side pressure chamber C1 by a coil spring 48 as the contraction-side spring element 25 interposed between the bottom portion and the step portion 46c formed in the inner circumference of the casing member 46.

By configuring the contraction-side sensitive mechanism RMC in this manner, it is possible to assemble the contraction-side sensitive mechanism RMC to the shock absorber S1 without any especial difficulty and specifically implement the shock absorber S1.

Second Embodiment

Next, a description will now be made for a shock absorber S2 according to a second embodiment of the present invention.

Figure 5:
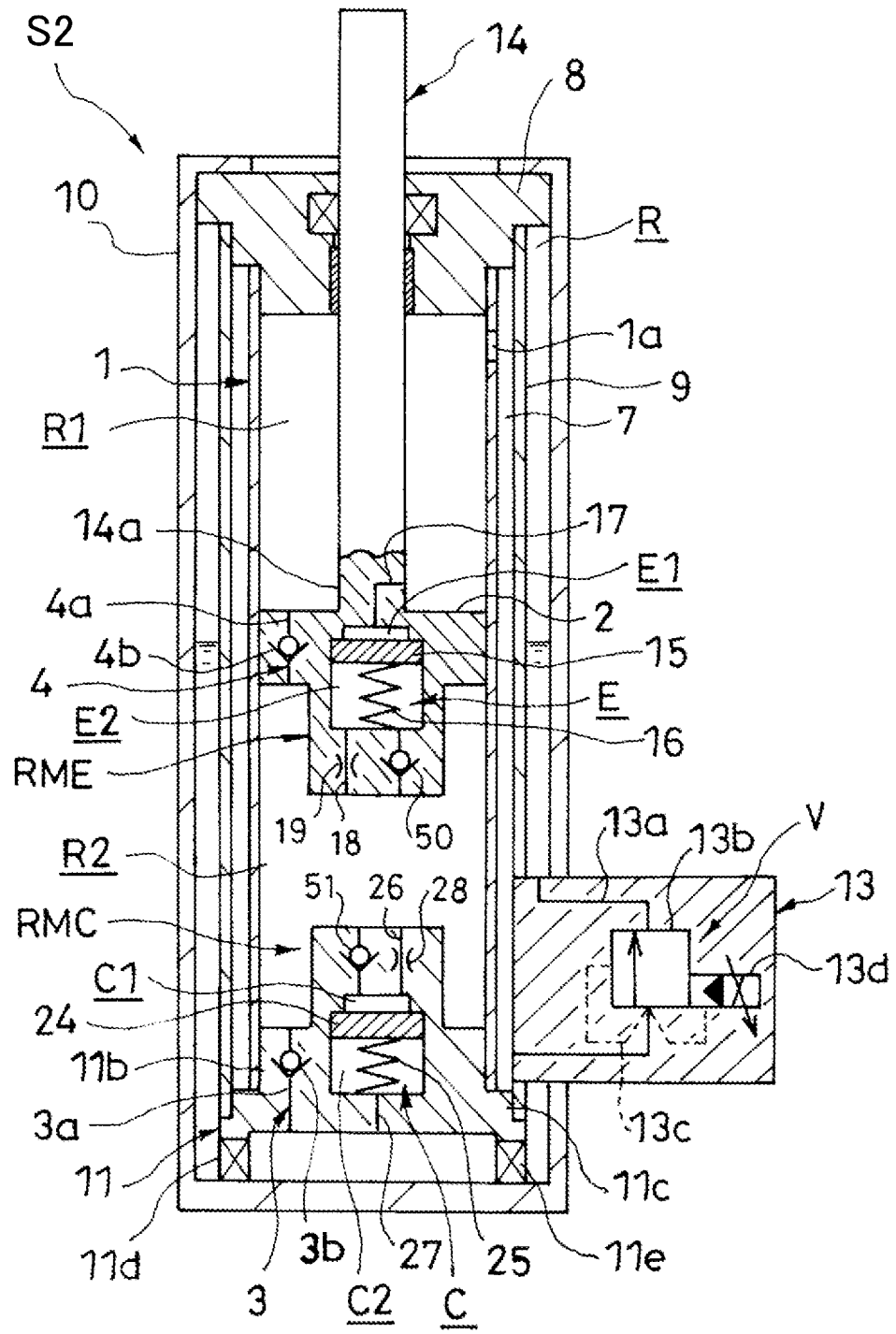
FIG. 5 is a cross-sectional view illustrating a shock absorber according to a second embodiment of the present invention.

Referring to FIG. 5, the shock absorber S2 is provided with a check valve 50 that allows only a flow of hydraulic oil directed from the contraction-side chamber R2 to the expansion-side chamber R1. The check valve 50 is arranged in parallel with the expansion-side valve element 19.

According to this embodiment, the expansion-side valve element 19 is provided in the second expansion-side passage 18. Therefore, the check valve 50 is preferably set to allow only a flow of hydraulic oil directed from the contraction-side chamber R2 to the second expansion-side pressure chamber E2 corresponding to a flow of hydraulic oil directed from the contraction-side chamber R2 to the expansion-side chamber R1.

As a result, when the shock absorber S2 makes an expanding motion so that the expansion-side free piston 15 moves to compress the second expansion-side pressure chamber E2 by virtue of the pressure from the expansion-side chamber R1, and then, the shock absorber S2 makes a contracting motion, the check valve 50 is opened. Therefore, it is possible to rapidly release the highly compressed pressure of the first expansion-side pressure chamber E1 to follow the decompressed pressure of the expansion-side chamber R1. Therefore, by virtue of the biasing force of the expansion-side spring element 16, the expansion-side free piston 15 can be pushed back to compress the first expansion-side pressure chamber E1.

As a result, it is possible to prevent reduction of a displacement margin of the expansion-side free piston 15 for compressing the second expansion-side pressure chamber E2, that may be generated when vibrations are continuously input to the shock absorber S2, and a residual pressure of the first expansion-side pressure chamber E1 forces the expansion-side free piston 15 to be deviated to the second expansion-side pressure chamber E2 side.

In this manner, using the shock absorber S2, it is possible to prevent the expansion-side free piston 15 from being deviated to the second expansion-side pressure chamber E2 side. Therefore, it is possible to prevent reduction of a displacement margin of the expansion-side free piston 15 during the expanding motion and a failure in obtaining the damping force attenuation effect.

When the expansion-side valve element 19 is provided in the first expansion-side passage 17, the check valve 50 may be provided in parallel with the expansion-side valve element 19 to allow only a flow of hydraulic oil directed from the first expansion-side pressure chamber E1 to the expansion-side chamber R1.

In addition, the shock absorber S2 may be provided with a check valve 51 in parallel with the contraction-side valve element 28 to allow only a flow of hydraulic oil directed from the reservoir R to the contraction-side chamber R2.

According to this embodiment, the contraction-side valve element 28 is provided in the first contraction-side passage 26. Therefore, the check valve 51 is preferably set to allow only a flow of hydraulic oil directed from the first contraction-side pressure chamber C1 to the contraction-side chamber R2 corresponding to a flow of hydraulic oil directed from the reservoir R to the contraction-side chamber R2.

As a result, when the shock absorber S2 makes a contracting motion so that the contraction-side free piston 24 moves to compress the second contraction-side pressure chamber C2 by virtue of the pressure from the contraction-side chamber R2, and then, the shock absorber S2 makes an expanding motion, the check valve 51 is opened. Therefore, it is possible to rapidly release the highly compressed pressure of the first contraction-side pressure chamber C1 to follow the decompressed pressure of the contraction-side chamber R2. Therefore, by virtue of the biasing force of the contraction-side spring element 25, the contraction-side free piston 24 can be pushed back to compress the first contraction-side pressure chamber C1.

As a result, it is possible to prevent reduction of a displacement margin of the contraction-side free piston 24 for compressing the second contraction-side pressure chamber C2, that may be generated when vibrations are continuously input to the shock absorber S2, and a residual pressure of the first contraction-side pressure chamber C1 forces the contraction-side free piston 24 to be deviated to the second contraction-side pressure chamber C2 side.

In this manner, using the shock absorber S2, it is possible to prevent the contraction-side free piston 24 from being deviated to the second contraction-side pressure chamber C2 side. Therefore, it is possible to prevent reduction of a displacement margin of the contraction-side free piston 24 during the contracting motion and a failure in obtaining the damping force attenuation effect.

When the contraction-side valve element 28 is provided in the second contraction-side passage 27, the check valve 51 may be provided in parallel with the contraction-side valve element 28 to allow only a flow of hydraulic oil directed from the reservoir R to the second contraction-side pressure chamber C2.

Figure 6:
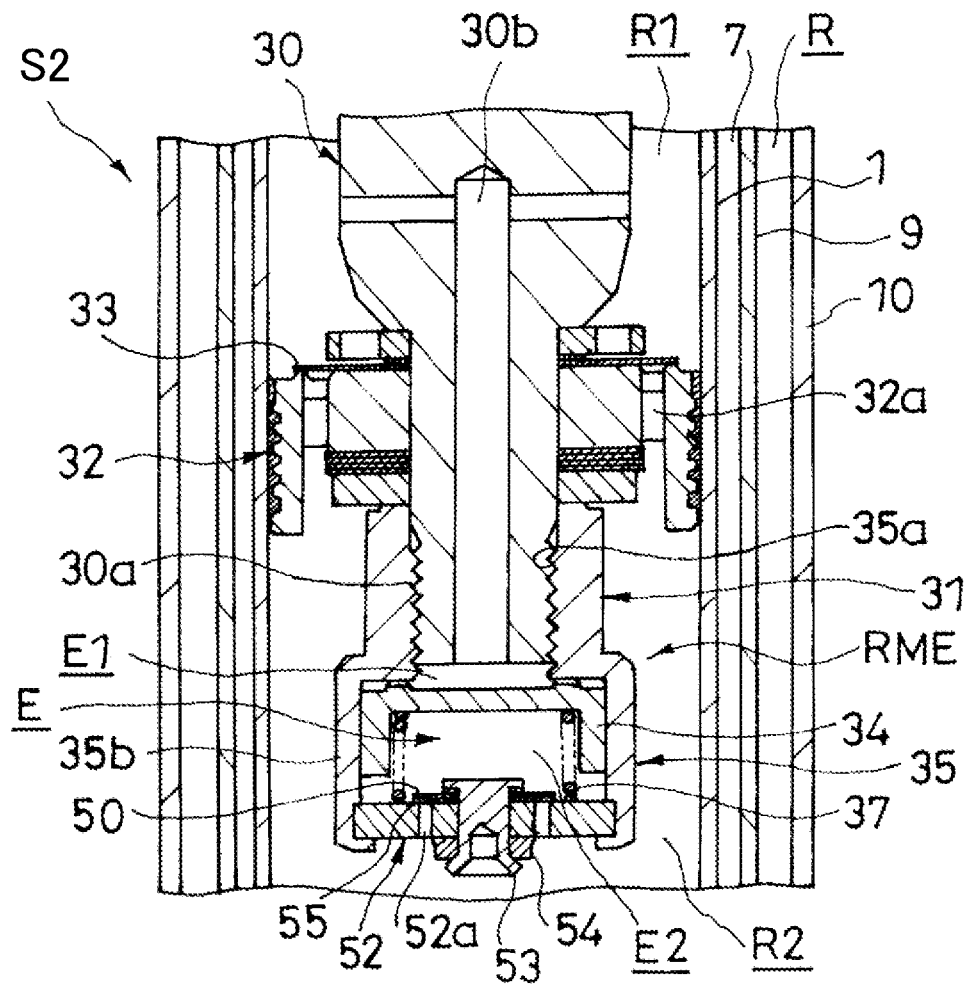
FIG. 6 is a cross-sectional view illustrating an expansion-side sensitive mechanism according to the second embodiment of the present invention.

When the check valve 50 is specifically applied to the shock absorber S2, for example, the lid member 36 of the expansion-side housing 31 of the shock absorber S1 of FIG. 3 may be modified as illustrated in FIG. 6.

The lid member 52 of the shock absorber S2 of FIG. 6 blocks the opening end of the casing member 35 and has a port 52a that causes the second expansion-side pressure chamber E2 and the contraction-side chamber R2 to communicate with each other. In addition, a disc-like check valve 50 that blocks the opening end of the second expansion-side pressure chamber E2 side of the port 52a is stacked on the lid member 52. The check valve 50 is mounted to the outer circumference of the center rod 53 penetrating through the lid member 52. The center rod 53 fixes the check valve 50 to the lid member 52 in conjunction with a ring 54 caulked to the leading edge. The check valve 50 can be flexed toward the outer circumference side while the inner circumference side is fixed to the lid member 52 by the center rod 53.

The check valve 50 is flexed for a flow of hydraulic oil directed from the contraction-side chamber R2 to the second expansion-side pressure chamber E2 to open the port 52a. For a reverse flow, the check valve 50 closes the port 52a to inhibit the reverse flow.

The check valve 50 is provided with an orifice 55 formed by notching. When the check valve 50 is closed, and the port 52a is closed, the orifice 55 acts as the second expansion-side passage 18 and the expansion-side valve element 19 for generating resistance to a flow of hydraulic oil directed from the second expansion-side pressure chamber E2 to the contraction-side chamber R2.

As a result, it is possible to provide the shock absorber S2 with the check valve 50 and the orifice 55 acting as the expansion-side valve element 19 and the second expansion-side passage 18 without any especial difficulty by saving space.

Figure 7:
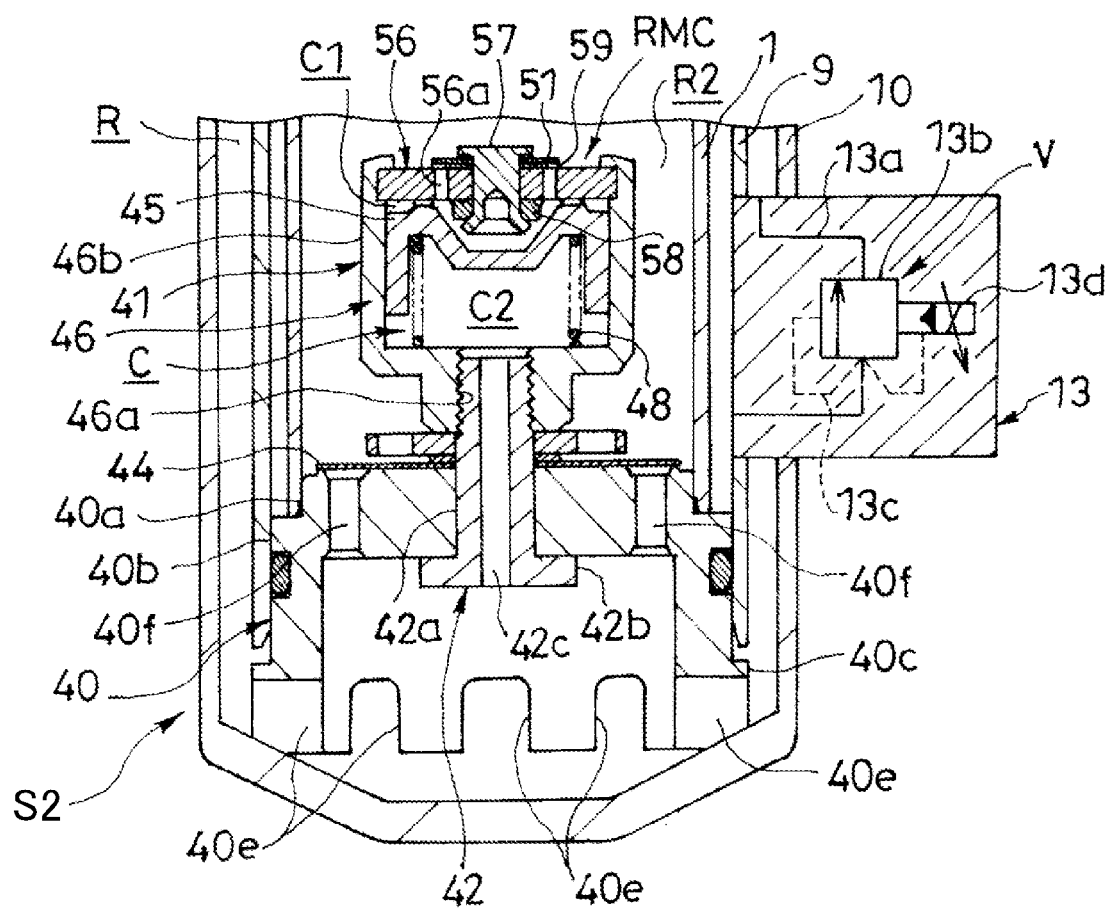
FIG. 7 is a cross-sectional view illustrating a contraction-side sensitive mechanism according to the second embodiment of the present invention.

When the check valve 51 is specifically applied to the shock absorber S2, for example, the lid member 47 of the contraction-side housing 41 of the shock absorber S1 of FIG. 4 may be modified as illustrated in FIG. 7.

The lid member 56 of the shock absorber S2 of FIG. 7 blocks the opening end of the casing member 46 and has a port 56a that causes the first contraction-side pressure chamber C1 and the contraction-side chamber R2 to communicate with each other. In addition, a disc-like check valve 51 that blocks the opening end of the contraction-side chamber R2 side of the port 56a is stacked on the lid member 56. The check valve 51 is mounted to the outer circumference of the center rod 57 penetrating through the lid member 56. The center rod 57 fixes the check valve 51 to the lid member 56 in conjunction with a ring 58 caulked and fixed to the leading edge. The outer circumference side of the check valve 51 can be flexed while its inner circumference side is fixed to the lid member 56 by the center rod 57.

The check valve 51 is flexed for a flow of hydraulic oil directed from the second contraction-side pressure chamber C2 to the contraction-side chamber R2 to open the port 56a. For a reverse flow, the port 56a is closed to inhibit the reverse flow.

In addition, the check valve 51 is provided with an orifice 59 formed by notching. When the check valve 51 is closed, and the port 56a is closed, the orifice 59 acts as the first contraction-side passage 26 and the contraction-side valve element 28 for generating resistance to a flow of hydraulic oil directed from the contraction-side chamber R2 to the first contraction-side pressure chamber C1.

As a result, it is possible to provide the shock absorber S2 with the check valve 51 and the orifice 59 acting as the contraction-side valve element 28 and the first contraction-side passage 26 without any especial difficulty by saving space.

In the shock absorber S1 of FIG. 3, when the expansion-side free piston 34 fully compresses the second expansion-side pressure chamber E2, the lower end of the tubular portion of the expansion-side free piston 34 abuts on the lid member 36, so that further movement of the expansion-side free piston 34 for compressing the second expansion-side pressure chamber E2 is restricted.

In this case, if the expansion-side free piston 34 and the lid member 36 collide with each other violently, a striking sound is generated and is recognized by passengers in a vehicle as a noise. Similarly, if the expansion-side free piston 34 and the casing member 35 collide with each other violently when the expansion-side free piston 34 is returned to the full compressing position of the first expansion-side pressure chamber E1 by the coil spring 37, a striking sound is generated and is recognized by passengers in a vehicle as a noise.

Figure 8:
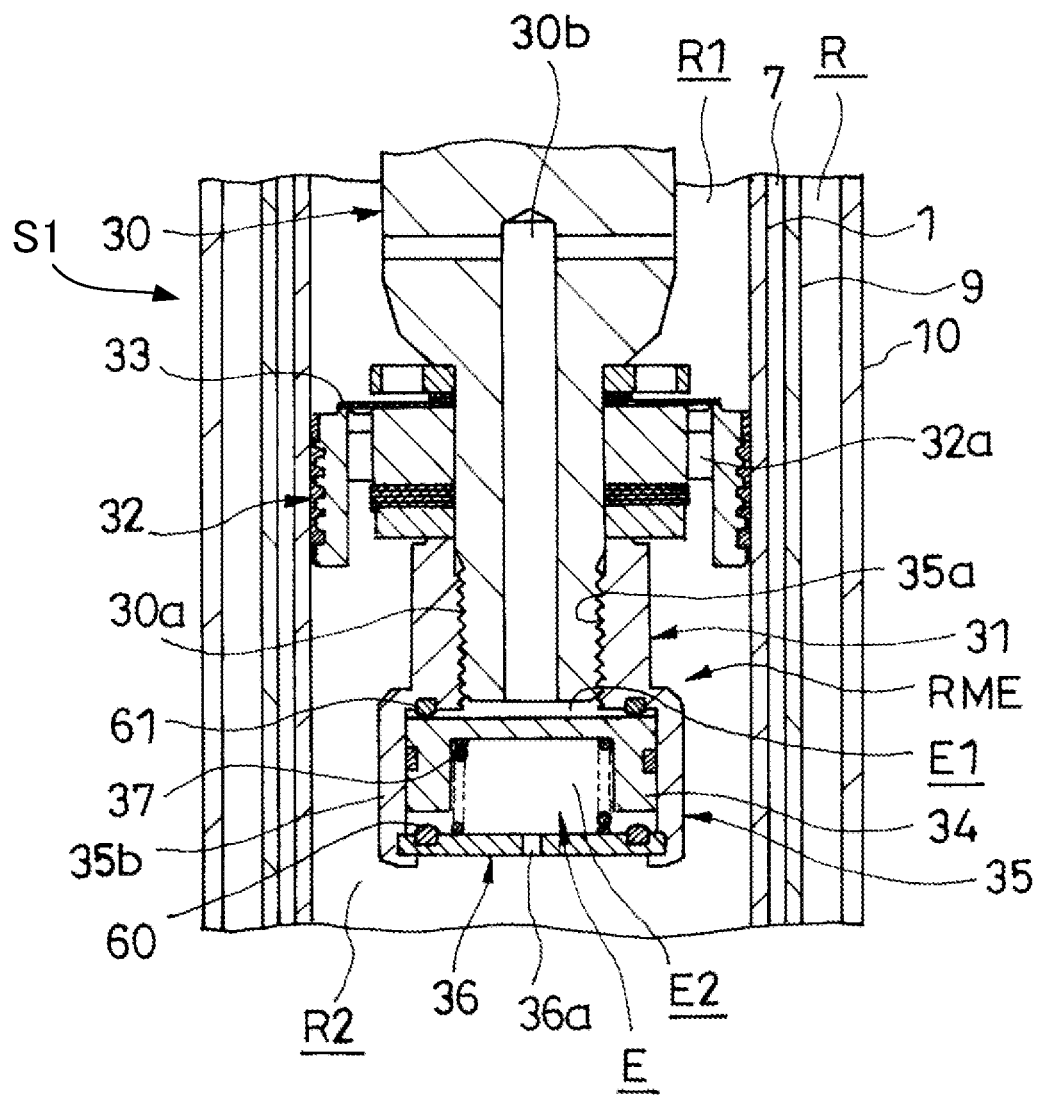
FIG. 8 is a cross-sectional view illustrating an expansion-side sensitive mechanism provided with an expansion-side cushioning mechanism.

In this regard, in order to alleviate the striking sound level, it is preferable to provide an expansion-side cushioning mechanism as an expansion-side cushioning portion as illustrated in FIG. 8, including a cushion 60 that brings in contact with the expansion-side free piston 34 to inhibit collision between the expansion-side free piston 34 and the lid member 36 when the expansion-side free piston 34 is displaced up to the stroke end, and a cushion 61 that brings in contact with the expansion-side free piston 34 to inhibit collision between the expansion-side free piston 34 and the casing member 35 when the expansion-side free piston 34 returns to the full compressing position of the first expansion-side pressure chamber E1.

The cushions 60 and 61 may have an annular shape. In addition, a plurality of cushions 60 and 61 may be provided in places of the lid member 36 and the casing member 35 where the expansion-side free piston 34 collides. Alternatively, a cushion may be provided in the expansion-side free piston 34 to bring into contact with the lid member 36 and the casing member 35. The cushion may be formed of an elastic body such as rubber or synthetic resin or may include a waved washer or a disc spring.

Figure 15:
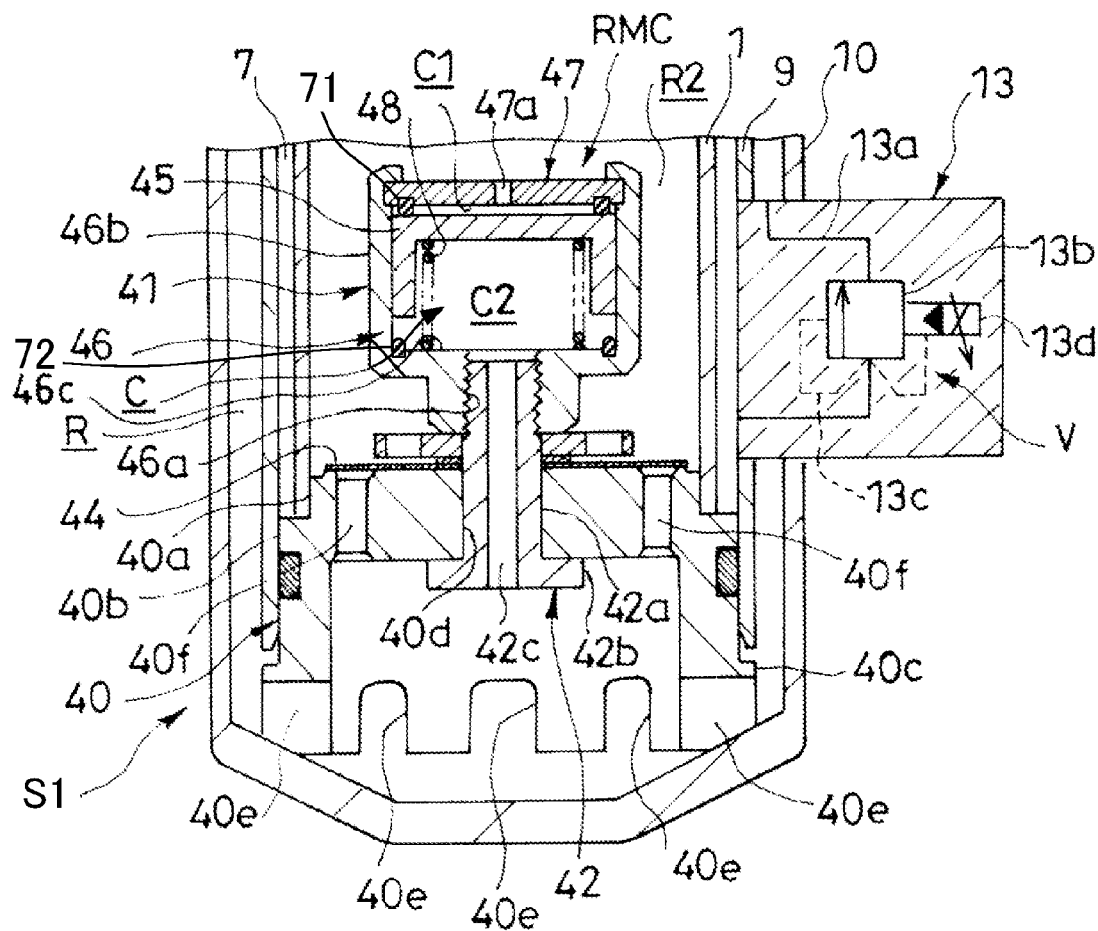
FIG. 15 is cross-sectional view illustrating a contraction-side sensitive mechanism provided with a contraction-side cushioning mechanism.

Naturally, the cushion may be applied to the contraction-side sensitive mechanism RMC. For example, if a cushion is provided in the contraction-side sensitive mechanism RMC of FIG. 4, cushions 71 and 72 may be installed to the casing member 46 and the lid member 47 to act as a contraction-side cushioning mechanism as a contraction-side cushioning portion as illustrated in FIG. 15 to inhibit direct collision between the contraction-side free piston 45 and the contraction-side housing 41. Alternatively, a cushion may also be provided in the contraction-side free piston 45.

As a result, it is possible to alleviate a striking sound level generated when the expansion-side free piston 34 collides with the expansion-side housing 31 and a striking sound level generated when the contraction-side free piston 45 collides with the contraction-side housing 41. Therefore, it is possible to prevent a vehicle passenger from having an uncomfortable or uneasy feeling. Naturally, the expansion-side cushioning mechanism and the contraction-side cushioning mechanism may also be applied to the shock absorber S2.

Figure 9:
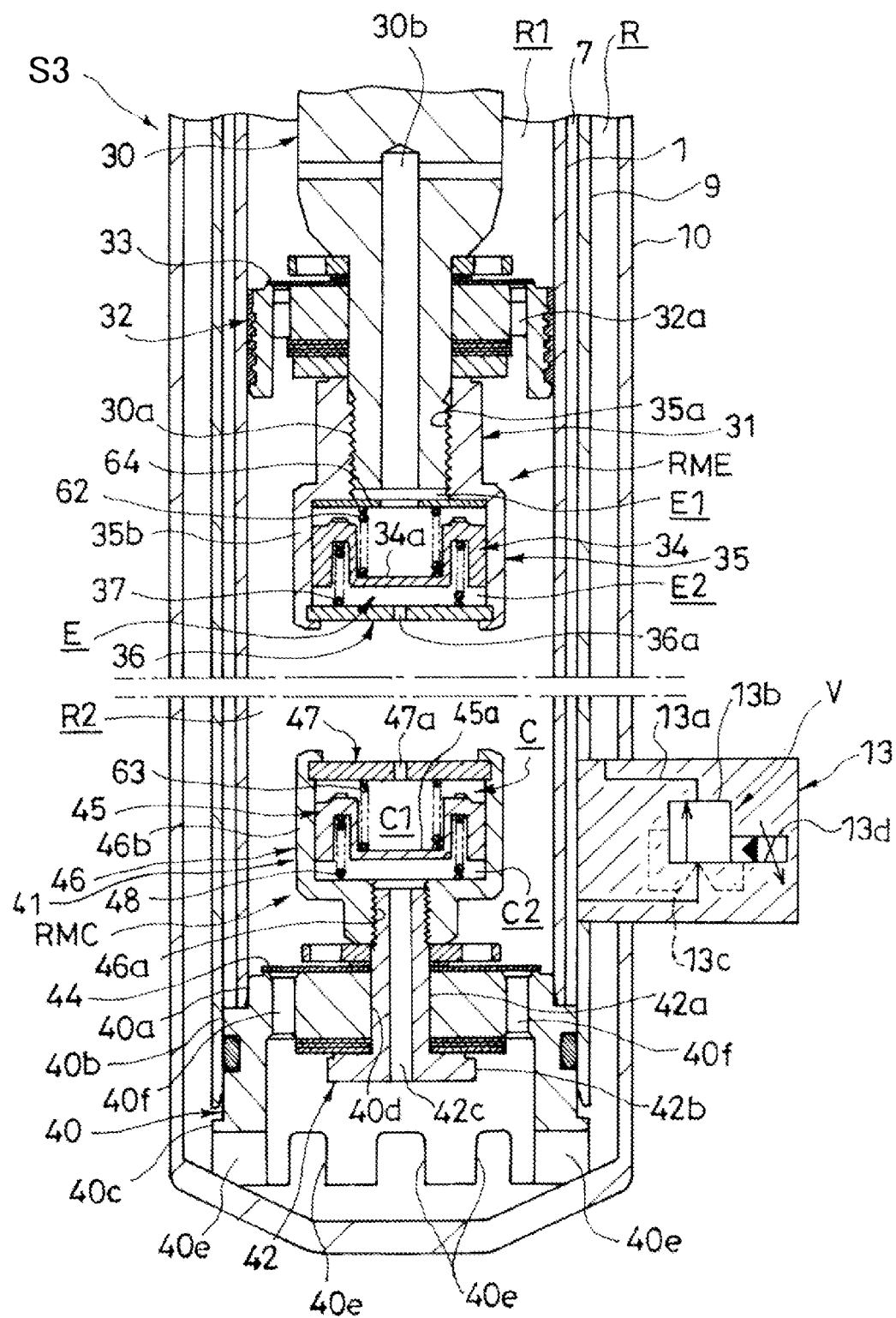
FIG. 9 is a cross-sectional view illustrating a shock absorber provided with an expansion-side sensitive mechanism having an expansion-side cushioning spring and a contraction-side sensitive mechanism having a contraction-side cushioning spring.

Instead of the cushion, as illustrated in the shock absorber S3 of FIG. 9, an expansion-side cushioning spring 62 as an expansion-side cushioning spring element for exerting a biasing force against the coil spring 37 may be provided between the expansion-side free piston 34 and the casing member 35 to support the expansion-side free piston 34 in a floating manner, and a contraction-side cushioning spring 63 as a contraction-side cushioning spring element for exerting a biasing force against the coil spring 48 may be provided between the contraction-side free piston 45 and the lid member 47 to support the contraction-side free piston 45 in a floating manner.

The expansion-side free piston 34 is provided with a concave portion 34a in its bottom, and the expansion-side cushioning spring 62 is inserted into the concave portion 34a. In addition, a perforated annular spring bearing 64 is housed in the free piston housing portion 35b of the expansion-side housing 31, and the expansion-side cushioning spring 62 is interposed between the spring bearing 64 and the bottom of the concave portion 34a.

The coil spring 37 is inserted into a gap between the concave portion 34a of the expansion-side free piston 34 and the tubular portion. As a result, it is possible to reduce a total length of the expansion-side sensitive mechanism RME while the stroke lengths of the expansion-side cushioning spring 61 and the coil spring 37 are guaranteed.

As the expansion-side free piston 34 is displaced to compress the first expansion-side pressure chamber E1, the expansion-side cushioning spring 62 raises the biasing force for suppressing this displacement depending on the displacement amount of the expansion-side free piston 34. For this reason, it is possible to decelerate the speed of the expansion-side free piston 34 before the expansion-side free piston 34 collides with the casing member 35. Therefore, it is possible to reduce a striking sound level generated when the expansion-side free piston 34 collides with the expansion-side housing 31 and prevent a vehicle passenger from having an uncomfortable or uneasy feeling.

Similarly, the contraction-side free piston 45 is provided with a concave portion 45a, and the contraction-side cushioning spring 63 is inserted into the concave portion 45a. The coil spring 48 is interposed between the concave portion 45a of the contraction-side free piston 45 and the tubular portion. As a result, it is possible to reduce a total length of the contraction-side sensitive mechanism RMC while stroke lengths of the coil spring 48 and the contraction-side cushioning spring 63 are guaranteed.

As the contraction-side free piston 45 is displaced to compress the first contraction-side pressure chamber C1, the contraction-side cushioning spring 63 raises the biasing force for suppressing this displacement depending on the displacement amount of the contraction-side free piston 45. For this reason, it is possible to decelerate the speed of the contraction-side free piston 45 before the contraction-side free piston 45 collides with the contraction-side housing 41.

Therefore, it is possible to reduce a striking sound level generated when the contraction-side free piston 45 collides with the contraction-side housing 41 and prevent a vehicle passenger from having an uncomfortable or uneasy feeling.

Figure 10:
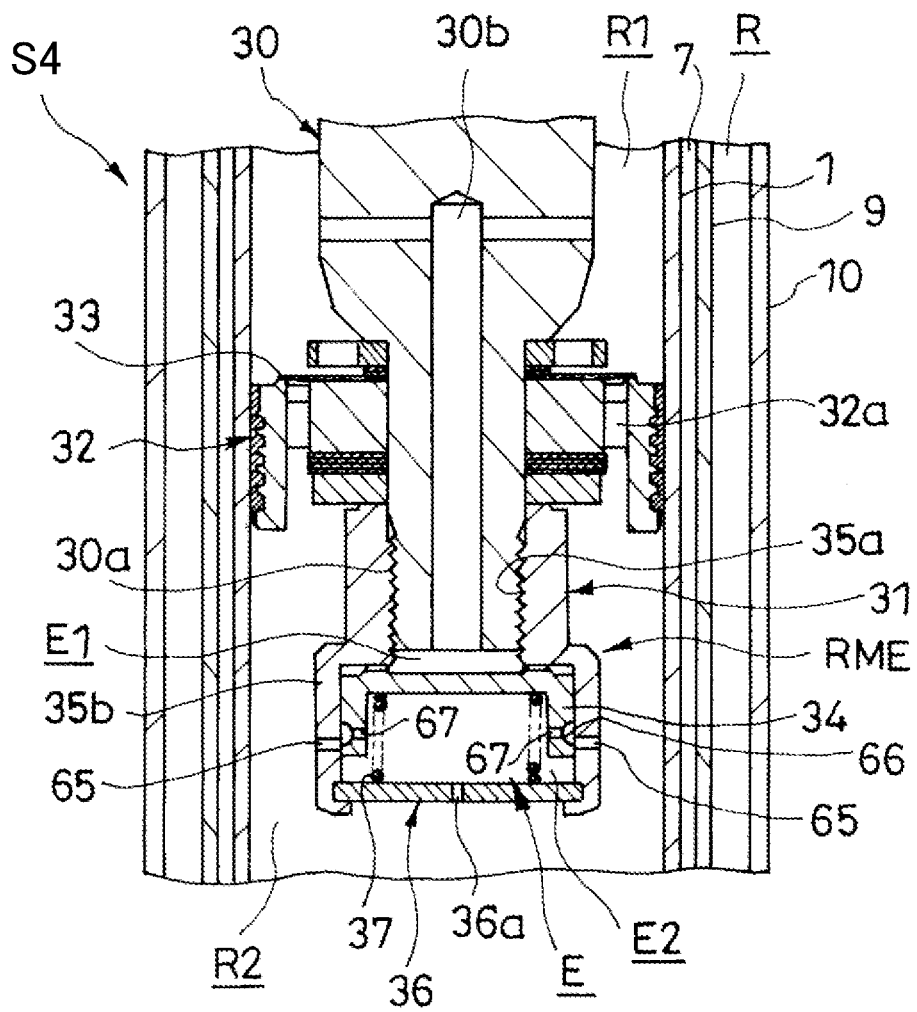
FIG. 10 is a cross-sectional view illustrating an expansion-side sensitive mechanism provided with an expansion-side liquid pressure cushioning mechanism.

In order to prevent the expansion-side free piston 34 from violently colliding with the lid member 36, as illustrated in the shock absorber S4 of FIG. 10, the structure of the shock absorber S1 may be additionally provided with an expansion-side liquid pressure cushioning mechanism as an expansion-side liquid pressure cushioning portion for preventing the expansion-side free piston 34 from violently colliding with the expansion-side housing 31 by reducing a flow passage area of the second expansion-side passage 18 as the expansion-side free piston 34 is displaced up to the stroke end.

The expansion-side liquid pressure cushioning mechanism has an orifice 65 that is opened from the outside of the free piston housing portion 35b of the casing member 35 and communicates with the inside, an annular groove 66 formed along a circumferential direction of the outer circumference of the tubular portion of the expansion-side free piston 34, and a passage 67 provided in the expansion-side free piston 34 to cause the second expansion-side pressure chamber E2 to communicate with the annular groove 66.

While the expansion-side free piston 34 is positioned to fully compress the first expansion-side pressure chamber E1, the annular groove 66 faces the orifice 65. In this state, the contraction-side chamber R2 and the second expansion-side pressure chamber E2 communicate with each other through the orifice 65, the annular groove 66, and the passage 67. In addition, the second expansion-side pressure chamber E2 also communicates with the contraction-side chamber R2 through the orifice 36a provided in the lid member 36. Therefore, the orifice 65, the annular groove 66, and the passage 67 constitute the second expansion-side passage 18 in conjunction with the orifice 36a.

As the expansion-side free piston 34 presses the coil spring 37 and makes displacement to compress the second expansion-side pressure chamber E2, the orifice 65 does not face the annular groove 66 until the expansion-side free piston 34 reaches its stroke end. In addition, the orifice 65 is slowly blocked by the outer circumference of the expansion-side free piston 34, so that the flow passage area of the second expansion-side passage 18 is reduced up to the cross-sectional area of the orifice 36a.

In this manner, as the expansion-side free piston 34 is displaced to compress the second expansion-side pressure chamber E2 up to the vicinity of the stroke end, the flow passage area of the second expansion-side passage 18 is slowly reduced. In addition, the pressure inside the second expansion-side pressure chamber E2 increases so as to restrain movement of the expansion-side free piston 34. As a result, it is possible to decelerate the expansion-side free piston 34.

Therefore, it is possible to prevent the expansion-side free piston 34 from violently colliding with the expansion-side housing 31. As a result, it is possible to reduce a striking sound level generated when both components make contact and prevent a vehicle passenger from having an uncomfortable or uneasy feeling.

It is noted that an alternative structure may be employed, in which the flow passage area of the first expansion-side passage 17 is reduced by displacing the expansion-side free piston 34 to compress the second expansion-side pressure chamber E2. Alternatively, a liquid pressure lock chamber may be employed, which is locked by displacement of the expansion-side free piston 34 for compressing the second expansion-side pressure chamber E2 so as to stop the movement of the expansion-side free piston 34 by virtue of an internal pressure.

Figure 11:
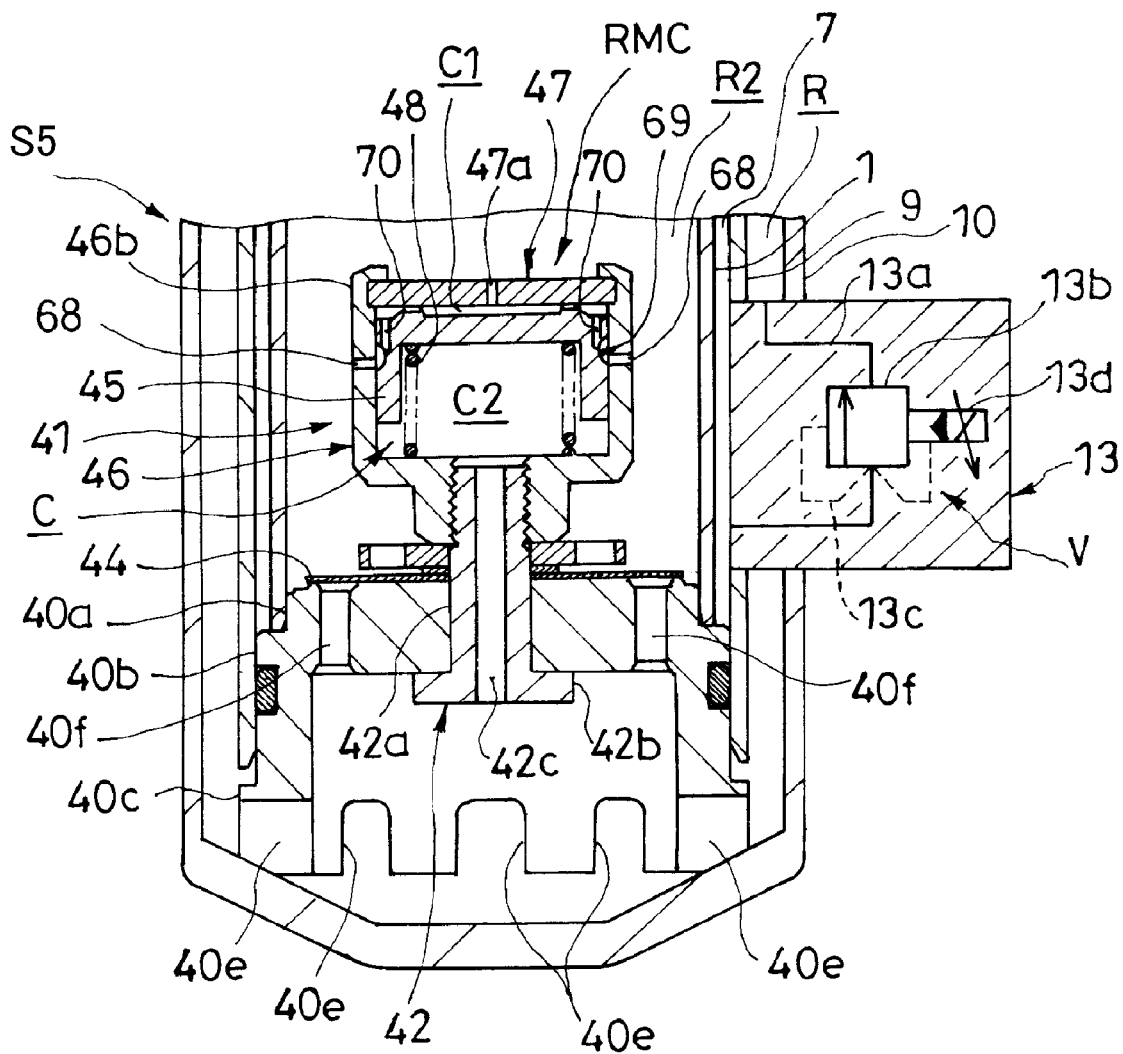
FIG. 11 is a cross-sectional view illustrating an expansion-side sensitive mechanism provided with a contraction-side liquid pressure cushioning mechanism.

Naturally, the liquid pressure cushioning mechanism may also be applied to the contraction-side sensitive mechanism RMC. If the liquid pressure cushioning mechanism is provided in the contraction-side sensitive mechanism RMC, for example, as illustrated in the shock absorber S5 of FIG. 11, a contraction-side liquid pressure cushioning mechanism as a contraction-side liquid pressure cushioning portion may be built by providing an orifice 68 in the casing member 46 and providing an annular groove 69 and a passage 70 that causes the annular groove 69 to communicate with the first contraction-side pressure chamber C1 in the contraction-side free piston 45.

In this case, while the contraction-side free piston 45 is positioned to fully compress the first contraction-side pressure chamber C1, the annular groove 69 faces the orifice 68. In this state, the contraction-side chamber R2 and the first contraction-side pressure chamber C1 communicate with each other through the orifice 68, the annular groove 69, and the passage 70. In addition, the first contraction-side pressure chamber C1 also communicates with the contraction-side chamber R2 through the orifice 47a of the lid member 47. Therefore, the orifice 68, the annular groove 69, and the passage 70 constitute the first contraction-side passage 26 in conjunction with the orifice 47a.

As the contraction-side free piston 45 presses the coil spring 48 and is displaced to compress the second contraction-side pressure chamber C2, the orifice 68 does not face the annular groove 69 until the contraction-side free piston 45 reaches its stroke end. In addition, the orifice 68 is slowly blocked by the outer circumference of the contraction-side free piston 45, so that the flow passage area of the first contraction-side passage 26 is reduced up to the cross-sectional area of the orifice 47a.

In this manner, as the contraction-side free piston 45 is displaced up to the vicinity of the stroke end so as to compress the second contraction-side pressure chamber C2, the flow passage area of the first contraction-side passage 26 is slowly reduced. In addition, the pressure inside of the first contraction-side pressure chamber C1 is suppressed from increasing so as to restrain the movement of the contraction-side free piston 45. As a result, it is possible to decelerate the contraction-side free piston 45.

Therefore, it is possible to prevent the contraction-side free piston 45 from violently colliding with the contraction-side housing 41. Therefore, it is possible to reduce a striking sound level generated when both components collide with each other and prevent a vehicle passenger from having an uncomfortable or uneasy feeling.

It is noted that the contraction-side liquid pressure cushioning mechanism may be provided with a structure for reducing the flow passage area of the second contraction-side passage 27 by displacing the contraction-side free piston 45 to compress the second contraction-side pressure chamber C2. Alternatively, a liquid pressure lock chamber may be employed, which is locked by displacement of the contraction-side free piston 45 for compressing the second contraction-side pressure chamber C2 so as to stop the movement of the contraction-side free piston 45 by virtue of an internal pressure.

Figure 12:
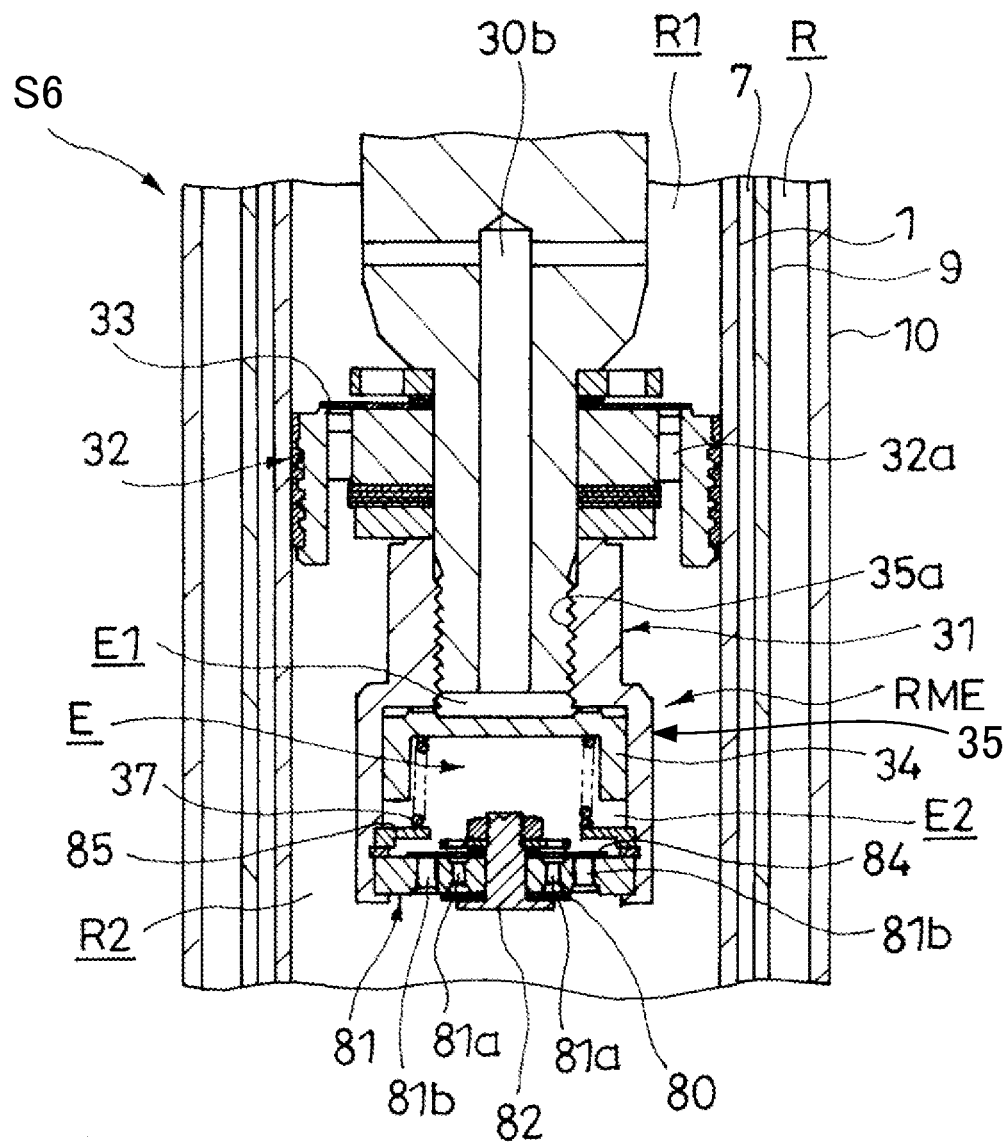
FIG. 12 is a cross-sectional view illustrating an expansion-side sensitive mechanism configured by using an expansion-side valve.

As illustrated in FIG. 12, the expansion-side sensitive mechanism RME of the shock absorber S6 may be provided with a valve having a valve body as the expansion-side valve element 19 instead of the orifice or the chalk.

The shock absorber S6 is obtained by applying an expansion-side valve 80 to the structure of the shock absorber S1 of FIG. 3. Specifically, as illustrated in FIG. 12, the expansion-side valve 80 is stacked on a lid member 81 that blocks the opening end of the casing member 35 of the expansion-side housing 31, so that the port 81a of the lid member 81 is opened or closed by the expansion-side valve 80.

The lid member 81 is provided with ports 81a and 81b that cause the second expansion-side pressure chamber E2 and the contraction-side chamber R2 to communicate with each other. The expansion-side valve 80 is a disc-like leaf valve. The expansion-side valve 80 is stacked on the contraction-side chamber R2 side of the lid member 81 and is mounted to the outer circumference of the center rod 82 penetrating through the lid member 81, while its inner circumferential side is fixed to the lid member 81.

As the outer circumference of the expansion-side valve 80 is flexed by virtue of the pressure of the second expansion-side pressure chamber E2, the port 81a is opened so that the hydraulic oil is allowed to flow from the second expansion-side pressure chamber E2 to the contraction-side chamber R2 while resistance is applied to the flow of hydraulic oil. Conversely, for the flow of hydraulic oil directed from the contraction-side chamber R2 to the second expansion-side pressure chamber E2, the port 81a is closed so as to act as a check valve for suppressing the flow of hydraulic oil.

The port 81b is opened or closed by the disc-like check valve 84. The check valve 84 is stacked on the second expansion-side pressure chamber E2 side of the lid member 81 and is mounted to the outer circumference of the center rod 82.

As the outer circumference of the check valve 84 is flexed by virtue of the pressure of the contraction-side chamber R2, the port 81b is opened so that the hydraulic oil is allowed to flow from the contraction-side chamber R2 to the second expansion-side pressure chamber E2. Conversely, for the flow of hydraulic oil directed from the second expansion-side pressure chamber E2 to the contraction-side chamber R2, the port 81b is closed to suppress the flow of hydraulic oil.

In the shock absorber S6, an annular spring bearing 85 is provided in the inner circumference of the casing member 35 in order to prevent the coil spring 37 that biases the expansion-side free piston 34 from interfering with the check valve 84. If there is no interference problem, the spring bearing 85 may be removed, and the coil spring 37 may be supported by the lid member 81.

In the shock absorber S6 configured as described above, similar to the shock absorber S1, it is possible to damp a vehicle vibration by adjusting the damping force by controlling the damping force variable valve V for a relatively low frequency vibration. In addition, for a high frequency vibration difficult to suppress by controlling the damping force variable valve V, a weak damping force can be exerted mechanically, so that it is possible to effectively suppress a vehicle vibration by blocking a vibration from the traveling wheel side. Therefore, it is possible to remarkably improve a vehicle ride quality.

In the shock absorber S6, as the expansion speed increases, and the flow rate of the hydraulic oil directed from the second expansion-side pressure chamber E2 to the contraction-side chamber R2 increases, the expansion-side valve 80 fully opens the port 81a depending on the flow rate. For this reason, even when the shock absorber S6 expands at a high speed range, it is possible to exert the damping force attenuation effect without fail.

In the shock absorber S6, the check valve 84 is arranged in parallel with the expansion-side valve 80. For this reason, as the shock absorber S6 starts to make a contracting motion after the expansion-side free piston 34 moves to compress the second expansion-side pressure chamber E2 by virtue of the pressure from the expansion-side chamber R1, the check valve 84 is opened. Therefore, it is possible to rapidly release the pressure of the highly compressed first expansion-side pressure chamber E1 to follow the decompressed expansion-side chamber R1. Therefore, by virtue of the biasing force of the coil spring 37, the expansion-side free piston 34 can be pushed back to compress the first expansion-side pressure chamber E1.

As a result, it is possible to prevent reduction of a displacement margin of the expansion-side free piston 34 for compressing the second expansion-side pressure chamber E2, that may be generated when vibrations are continuously input to the shock absorber S6, and a residual pressure of the first expansion-side pressure chamber E1 forces the expansion-side free piston 34 to be deviated to the second expansion-side pressure chamber E2 side.

In this manner, using the shock absorber S6, it is possible to prevent the expansion-side free piston 34 from being deviated to the second expansion-side pressure chamber E2 side. Therefore, it is possible to prevent reduction of a displacement margin of the expansion-side free piston 34 during an expanding motion and a failure in obtaining the damping force attenuation effect.

Figure 13:
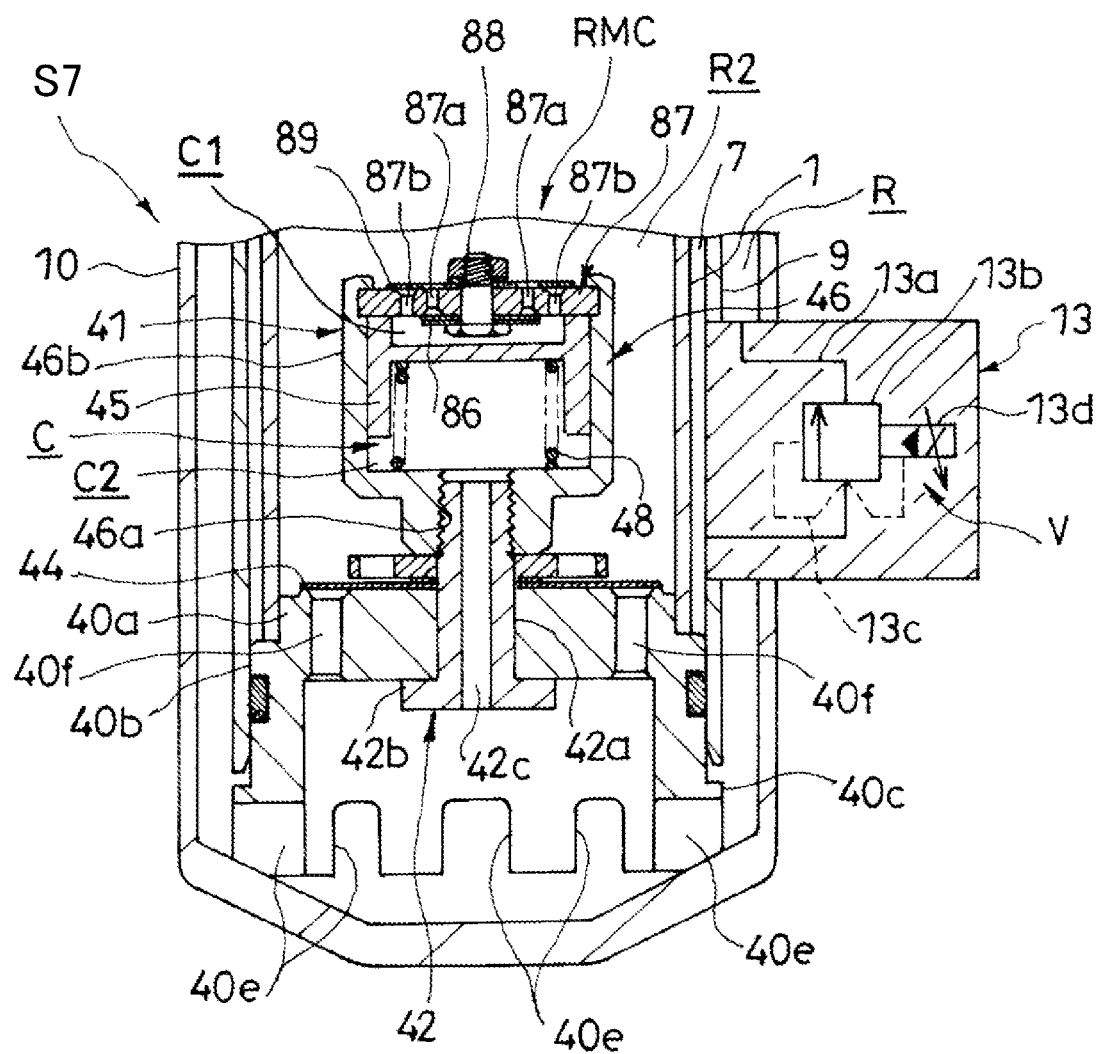
FIG. 13 is a cross-sectional view illustrating a contraction-side sensitive mechanism configured by using a contraction-side valve.

As illustrated in FIG. 13, the contraction-side sensitive mechanism RMC of the shock absorber S7 may be provided with a valve having a valve body as the contraction-side valve element 28 instead of the orifice or the chalk.

The shock absorber S7 is obtained by applying a contraction-side valve 86 to the structure of the shock absorber S1 of FIG. 4. Specifically, as illustrated in FIG. 13, the contraction-side valve 86 is stacked on a lid member 87 that blocks the opening end of the casing member 46 of the contraction-side housing 41, so that the port 87a of the lid member 87 is opened or closed by the contraction-side valve 86.

The lid member 87 is provided with ports 87a and 87b that cause the first contraction-side pressure chamber C1 and the contraction-side chamber R2 to communicate with each other. The contraction-side valve 86 is a disc-like leaf valve. The contraction-side valve 86 is stacked on the first contraction-side pressure chamber C1 side of the lid member 87 and is mounted to the outer circumference of the center rod 88 penetrating through the lid member 87, while its inner circumference side is fixed to the lid member 87.

As the outer circumference of the contraction-side valve 86 is flexed by virtue of the pressure of the contraction-side chamber R2, the port 87a is opened, so that the hydraulic oil is allowed to flow from the contraction-side chamber R2 to the first contraction-side pressure chamber C1 while resistance is generated in the flow of hydraulic oil. Conversely, for a flow of hydraulic oil directed from the first contraction-side pressure chamber C1 to the contraction-side chamber R2, the port 87a is closed, so that the contraction-side valve 86 acts as a check valve for suppressing the flow of hydraulic oil.

The port 87b is opened or closed by the disc-like check valve 89. The check valve 89 is stacked on the contraction-side chamber R2 side of the lid member 87 and is mounted to the outer circumference of the center rod 88.

As the outer circumference of the check valve 89 is flexed by virtue of the pressure of the first contraction-side pressure chamber C1, the port 87b is opened, so that the hydraulic oil is allowed to flow from the first contraction-side pressure chamber C1 to the contraction-side chamber R2. Conversely, for a flow of hydraulic oil directed from the contraction-side chamber R2 to the first contraction-side pressure chamber C1, the port 87b is closed so as to suppress the flow of hydraulic oil.

Using the shock absorber S7 configured as described above, similar to the shock absorber S1, it is possible to damp a vehicle vibration by adjusting the damping force by controlling the damping force variable valve V for a relatively low frequency vibration. In addition, for a high frequency vibration difficult to suppress by controlling the damping force variable valve V, a weak damping force can be exerted mechanically, so that it is possible to effectively suppress a vehicle vibration by blocking a vibration from the traveling wheel side. Therefore, it is possible to remarkably improve a vehicle ride quality.

In the shock absorber S7, as the contraction speed increases, and the flow rate of the hydraulic oil directed from the contraction-side chamber R2 to the first contraction-side pressure chamber C1 increases, the contraction-side valve 86 fully opens the port 87a depending on the flow rate. For this reason, even when the shock absorber S7 contracts at a high speed range, it is possible to exert the damping force attenuation effect without fail.

In the shock absorber S7, the check valve 89 is arranged in parallel with the contraction-side valve 86. For this reason, as the shock absorber S7 starts to make an expanding motion after the contraction-side free piston 45 moves to compress the second contraction-side pressure chamber C2 by virtue of the pressure from the contraction-side chamber R2, the check valve 89 is opened. Therefore, it is possible to rapidly release the pressure of the highly compressed first contraction-side pressure chamber C1 to follow the decompressed contraction-side chamber R2. Therefore, by virtue of the biasing force of the coil spring 48, the contraction-side free piston 45 can be pushed back to compress the first contraction-side pressure chamber C1.

As a result, it is possible to prevent reduction of a displacement margin of the contraction-side free piston 45 for compressing the second contraction-side pressure chamber C2, that may be generated when vibrations are continuously input to the shock absorber S7, and a residual pressure of the first contraction-side pressure chamber C1 forces the contraction-side free piston 45 to be deviated to the second contraction-side pressure chamber C2 side.

In this manner, using the shock absorber S7, it is possible to prevent the contraction-side free piston 45 from being deviated to the second contraction-side pressure chamber C2 side. Therefore, it is possible to prevent reduction of a displacement margin of the contraction-side free piston 45 during the contracting motion and a failure in obtaining the damping force attenuation effect.

Naturally, both the expansion-side sensitive mechanism RME of the shock absorber S6 and the contraction-side sensitive mechanism RMC of the shock absorber S7 may also be employed at the same time.

Figure 14:
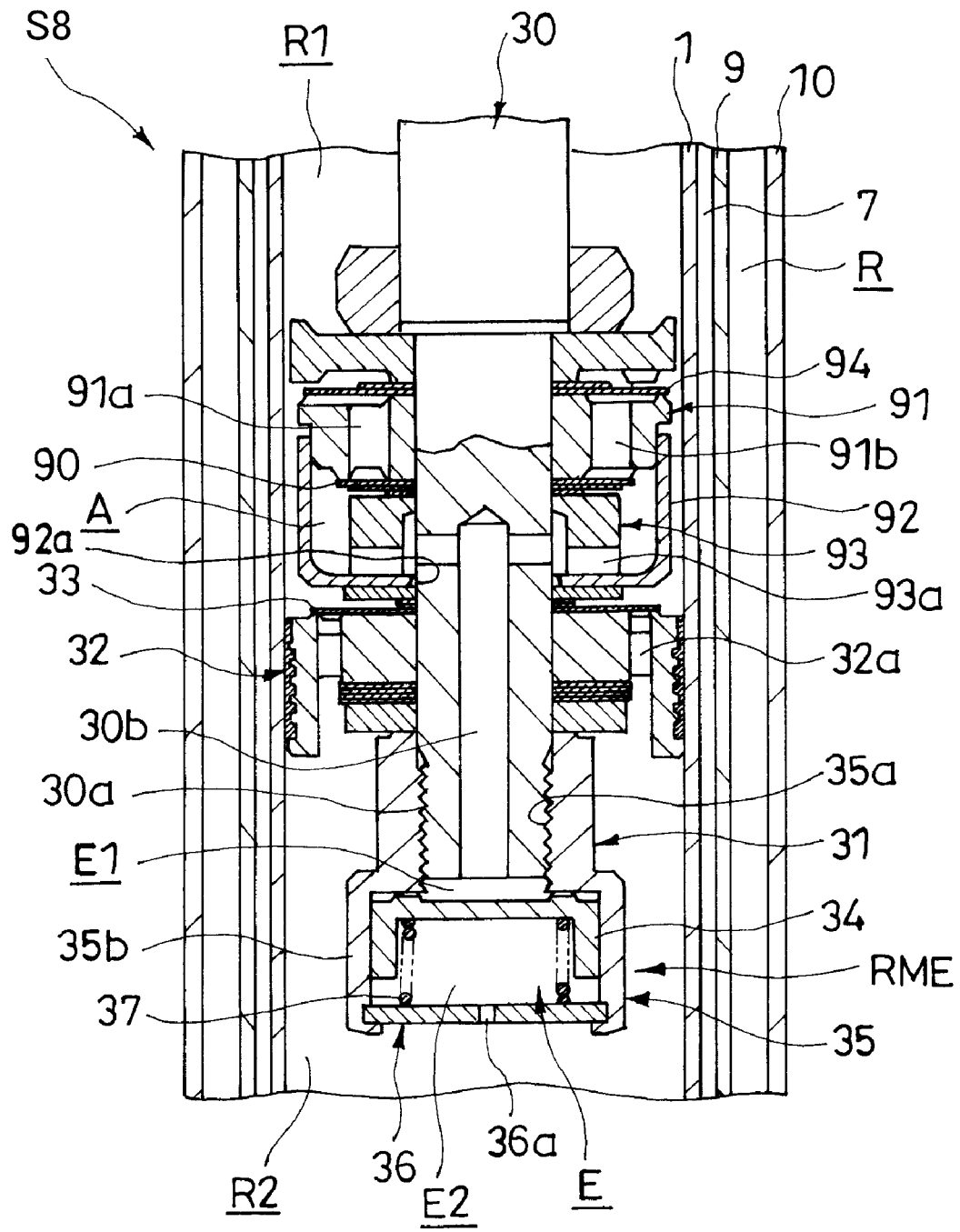
FIG. 14 is a cross-sectional view illustrating an expansion-side sensitive mechanism provided with an expansion-side valve in a first expansion-side passage.

Although the shock absorber S6 is provided with the expansion-side valve 80 in the second expansion-side passage 18, an expansion-side valve 90 may be provided in the first expansion-side passage 17 as illustrated in the shock absorber S8 of FIG. 14.

In addition to the configuration of the shock absorber S1 of FIG. 3, the shock absorber S8 includes a valve disc 91 provided closer to the expansion-side chamber R1 side of the outer circumference of the piston rod 30 relatively to the piston 32, a cap 92 mounted to the outer circumference of the piston rod 30 and fitted to the outer circumference of the valve disc 91, a tubular spacer 93 interposed between the valve disc 91 and the cap 92, an expansion-side valve 90 stacked beneath the valve disc 91 in FIG. 14, and a disc-like check valve 94 stacked above the valve disc 91 in FIG. 14.

The valve disc 91 having an annular shape is mounted to the outer circumference of the piston rod 30. The valve disc 91 is provided with ports 91a and 91b extending from the upper end to the lower end.

The cap 92 having a bottomed cylindrical shape is provided with a hole 92a in the bottom portion to receive the inserted piston rod 30. The cap 92 is mounted to the outer circumference of the piston rod 30 by using the bottom portion. In addition, the tubular portion is fitted to the outer circumference of the valve disc 91 to partition a room A inside the expansion-side chamber R1 in conjunction with the valve disc 91.

The spacer 93 having a tubular shape is interposed between the bottom portion of the cap 92 and the valve disc 91 and is installed to the outer circumference of the piston rod 30. The piston rod 30 is provided with a first expansion-side passage 30b communicating with the first expansion-side pressure chamber E1. The first expansion-side passage 30b is opened in a part of the outer circumference of the piston rod 30 facing the spacer 93.

The spacer 93 is provided with a notch 93a. The spacer 93 causes the first expansion-side passage 30b to communicate with the room A through the notch 93a. The room A communicates with the expansion-side chamber R1 through the ports 91a and 91b. Therefore, the first expansion-side pressure chamber E1 communicates with the expansion-side chamber R1 through the room A and the ports 91a and 91b.

The expansion-side valve 90 is an annular leaf valve. The expansion-side valve 90 is stacked beneath the valve disc 91 in FIG. 14 and is mounted to the outer circumference of the piston rod 30. The outer circumference of the expansion-side valve 90 can be flexed to open or close the lower end of the port 91a.

Therefore, in the expansion-side valve 90, the port 91a is opened for a flow of hydraulic oil directed from the expansion-side chamber R1 to the first expansion-side pressure chamber E1, and resistance is generated to the flow of hydraulic oil. For a reverse flow, the port 91a is closed to suppress a passage of the hydraulic oil.

The check valve 94 having a disc shape is stacked above the valve disc 91 in FIG. 14 and is mounted to the outer circumference of the piston rod 30. The outer circumference of the check valve 94 can be flexed to open or close the upper end of the port 91b.

Therefore, for a flow of hydraulic oil directed from the first expansion-side pressure chamber E1 to the expansion-side chamber R1, the check valve 94 opens the port 91b to allow a passage of the hydraulic oil. For a reverse flow, the check valve 94 closes the port 91b to suppress a passage of the hydraulic oil.

It is noted that the expansion-side valve 90 is designed not to block the lower end of the port 91b, and the check valve 94 is designed not to block the upper end of the port 91a.

In this manner, the expansion-side valve 90, the valve disc 91, the cap 92, the spacer 93, and the check valve 94 are arranged in the expansion-side chamber R1 side, which is a dead space in the structure of the shock absorber, rather than the piston 32. Therefore, it is possible to shorten a total length of the expansion-side housing 31 provided in the lower side in FIG. 14 relatively to the piston 32. Therefore, it is possible to provide the expansion-side valve 90 without sacrificing the stroke length.

In the shock absorber S8 configured as described above, similar to the shock absorber S1, it is possible to damp a vehicle vibration by adjusting the damping force by controlling the damping force variable valve V for a relatively low frequency vibration. In addition, for a high frequency vibration difficult to suppress by controlling the damping force variable valve V, a weak damping force can be exerted mechanically, so that it is possible to effectively suppress a vehicle vibration by blocking a vibration from the traveling wheel side. Therefore, it is possible to remarkably improve a vehicle ride quality.

In the shock absorber S8, as the expansion speed increases, and the flow rate of the hydraulic oil directed from the expansion-side chamber R1 to the first expansion-side pressure chamber E1 increases, the expansion-side valve 90 fully opens the port 91a depending on the flow rate. For this reason, even when the shock absorber S8 expands at a high speed range, it is possible to exert the damping force attenuation effect without fail.

In the shock absorber S8, the check valve 94 is arranged in parallel with the expansion-side valve 90. For this reason, as the shock absorber S8 starts to make a contracting motion after the expansion-side free piston 34 moves to compress the second expansion-side pressure chamber E2 by virtue of the pressure from the expansion-side chamber R1, the check valve 94 is opened. Therefore, it is possible to rapidly release the pressure of the highly compressed first expansion-side pressure chamber E1 to follow the decompressed expansion-side chamber R1. Therefore, by virtue of the biasing force of the coil spring 37, the expansion-side free piston 34 can be pushed back to compress the first expansion-side pressure chamber E1.

As a result, it is possible to prevent reduction of a displacement margin of the expansion-side free piston 34 for compressing the second expansion-side pressure chamber E2, that may be generated when vibrations are continuously input to the shock absorber S8, and a residual pressure of the first expansion-side pressure chamber E1 forces the expansion-side free piston 34 to be deviated to the second expansion-side pressure chamber E2 side.

In this manner, using the shock absorber S8, it is possible to prevent the expansion-side free piston 34 from being deviated to the second expansion-side pressure chamber E2 side. Therefore, it is possible to prevent reduction of a displacement margin of the expansion-side free piston 34 during the expanding motion and a failure in obtaining the damping force attenuation effect.

Embodiments of the present invention were described above, but the above embodiments are merely examples of applications of the present invention, and the technical scope of the present invention is not limited to the specific constitutions of the above embodiments.

With respect to the above description, the contents of application No. 2013-194869, with a filing date of Sep. 20, 2013 in Japan, are incorporated herein by reference.

The invention claimed is:

1. A shock absorber comprising:
   a cylinder including an expansion-side chamber and a contraction-side chamber;
   a piston slidably inserted into the cylinder, and partitioning the cylinder into the expansion-side chamber and the contraction-side chamber;
   a piston rod movably inserted into the cylinder, the piston rod being connected to the piston;
   a reservoir that stores a hydraulic fluid;
   a charge passage configured to allow only a flow of hydraulic fluid directed from the reservoir to the contraction-side chamber;
   a rectification passage configured to allow only a flow of hydraulic fluid directed from the contraction-side chamber to the expansion-side chamber;
   a damping force adjuster configured to allow only a flow of hydraulic fluid directed from the expansion-side chamber to the reservoir and change resistance to the flow of hydraulic fluid; and
   at least one of an expansion-side sensitive unit operated in an expanding motion of the shock absorber and a contraction-side sensitive unit operated in a contracting motion of the shock absorber, the expansion-side sensitive unit having
      an expansion-side actuating chamber that communicates with the expansion-side chamber and the contraction-side chamber,
      an expansion-side free piston slidably inserted into the expansion-side actuating chamber, the expansion-side free piston partitioning the expansion-side actuating chamber into a first expansion-side pressure chamber communicating with the expansion-side chamber and a second expansion-side pressure chamber communicating with the contraction-side chamber, and
      an expansion-side spring element configured to bias the expansion-side free piston to compress the first expansion-side pressure chamber, the contraction-side sensitive unit having
      a contraction-side actuating chamber that communicates with the contraction-side chamber and the reservoir,
      a contraction-side free piston slidably inserted into the contraction-side actuating chamber, the contraction-side free piston partitioning the contraction-side actuating chamber into a first contraction-side pressure chamber communicating with the contraction-side chamber and a second contraction-side pressure chamber communicating with the reservoir, and
      a contraction-side spring element configured to bias the contraction-side free piston to compress the first contraction-side pressure chamber,
   the shock absorber being a uni-flow shock absorber and being configured so that the hydraulic fluid flows sequentially in only a one-way direction in the order of the contraction-side chamber, the expansion-side chamber, and the reservoir.

2. The shock absorber according to claim 1, further comprising:
   a first expansion-side passage that connects the first expansion-side pressure chamber and the expansion-side chamber;
   a second expansion-side passage that connects the second expansion-side pressure chamber and the contraction-side chamber; and
   an expansion-side valve element provided in at least one of the first expansion-side passage and the second expansion-side passage, the expansion-side valve element being configured to generate resistance to a flow of hydraulic fluid passing therethrough.

3. The shock absorber according to claim 2, wherein the expansion-side valve element is an expansion-side valve configured to allow only a flow of hydraulic fluid directed from the expansion-side chamber to the contraction-side chamber and generate resistance to the flow of hydraulic fluid.

4. The shock absorber according to claim 2, further comprising a check valve arranged in parallel with the expansion-side valve element, the check valve being configured to allow only a flow of hydraulic fluid directed from the contraction-side chamber to the expansion-side chamber.

5. The shock absorber according to claim 1, further comprising:
   a first contraction-side passage that connects the first contraction-side pressure chamber and the contraction-side chamber;
   a second contraction-side passage that connects the second contraction-side pressure chamber and the reservoir; and
   a contraction-side valve element provided in at least one of the first contraction-side passage and the second contraction-side passage, the contraction-side valve element being configured to generate resistance to a flow of hydraulic fluid passing therethrough.

6. The shock absorber according to claim 5, wherein the contraction-side valve element is a contraction-side valve configured to allow only a flow of hydraulic fluid directed from the contraction-side chamber to the reservoir and generate resistance to the flow of hydraulic fluid.

7. The shock absorber according to claim 5, further comprising a check valve arranged in parallel with the contraction-side valve element, the check valve being configured to allow only a flow of hydraulic fluid directed from the reservoir to the contraction-side chamber.

8. The shock absorber according to claim 1, further comprising:
   an expansion-side housing that forms the expansion-side actuating chamber; and
   an expansion-side cushioning portion configured to prevent collision between the expansion-side housing and the expansion-side free piston.

9. The shock absorber according to claim 1, further comprising:
   a contraction-side housing that forms the contraction-side actuating chamber; and
   a contraction-side cushioning portion configured to prevent collision between the contraction-side housing and the contraction-side free piston.

10. The shock absorber according to claim 1, further comprising:
    an expansion-side housing that forms the expansion-side actuating chamber; and
    an expansion-side liquid pressure cushioning portion configured to prevent collision between the expansion-side housing and the expansion-side free piston.

11. The shock absorber according to claim 1, further comprising:
    a contraction-side housing that forms the contraction-side actuating chamber; and
    a contraction-side liquid pressure cushioning portion configured to prevent collision between the contraction-side housing and the contraction-side free piston.

12. The shock absorber according to claim 1, further comprising:
    an expansion-side housing that forms the expansion-side actuating chamber; and
    an expansion-side cushioning spring element configured to bias the expansion-side free piston against the expansion-side spring element to compress the second expansion-side pressure chamber and prevent collision between the expansion-side housing and the expansion-side free piston.

13. The shock absorber according to claim 1, further comprising:
    a contraction-side housing that forms the contraction-side actuating chamber; and
    a contraction-side cushioning spring element configured to bias the contraction-side free piston against the contraction-side spring element to compress the second contraction-side pressure chamber and prevent collision between the contraction-side housing and the contraction-side free piston.

14. The shock absorber according to claim 1, further comprising an expansion-side housing that forms the expansion-side actuating chamber, the expansion-side housing being configured to act as a piston nut for connecting the piston to the piston rod.

15. The shock absorber according to claim 1, further comprising:
    a contraction-side housing that forms the contraction-side actuating chamber;
    a valve casing fitted to an end of the cylinder, the valve casing having an inlet port connecting the reservoir and the contraction-side chamber; and
    a check valve stacked on the valve casing, the check valve being configured to open or close the inlet port,
    wherein the charge passage includes the inlet port and the check valve, and
    the check valve is fixed to the valve casing by connecting the contraction-side housing to the valve casing.

* * * * *